United States Patent
Chun et al.

(10) Patent No.: US 10,856,248 B2
(45) Date of Patent: Dec. 1, 2020

(54) METHOD FOR SELECTING NETWORK PROVIDING RESTRICTED LOCAL OPERATOR SERVICE IN WIRELESS COMMUNICATION SYSTEM AND APPARATUS THEREOF

(71) Applicant: LG Electronics Inc., Seoul (KR)

(72) Inventors: Sungduck Chun, Seoul (KR);
Laeyoung Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/559,185

(22) Filed: Sep. 3, 2019

(65) Prior Publication Data

US 2020/0084741 A1  Mar. 12, 2020

Related U.S. Application Data

(60) Provisional application No. 62/725,280, filed on Aug. 31, 2018.

(30) Foreign Application Priority Data

Sep. 7, 2018 (KR) .................. 10-2018-0107206
Oct. 17, 2018 (KR) .................. 10-2018-0123642

(51) Int. Cl.
*H04W 4/00* (2018.01)
*H04W 60/00* (2009.01)
*H04W 12/08* (2009.01)
*H04W 48/16* (2009.01)
*H04W 84/04* (2009.01)

(52) U.S. Cl.
CPC ........... *H04W 60/00* (2013.01); *H04W 12/08* (2013.01); *H04W 48/16* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 10,506,506 B2 * | 12/2019 | Qiao | H04W 8/08 |
| 2015/0029930 A1 | 1/2015 | Horn et al. | |
| 2019/0053139 A1 * | 2/2019 | Basu Mallick | H04W 48/02 |

OTHER PUBLICATIONS

3rd Generation Partnership Project; Technical Specification Group Services and System Aspects; "Service accessibility (Release 16)," 3GPP TS 22.011 V16.2.0, dated Jun. 2018, 35 pages.

(Continued)

*Primary Examiner* — Erika A Washington
(74) *Attorney, Agent, or Firm* — Fish & Richardson P.C.

(57) ABSTRACT

A method for selecting, by a user equipment (UE), a public land mobile network (PLMN) in a wireless communication system is disclosed. The method includes attempting a registration on a PLMN selected by a user in a manual network selection mode, if the registration on the PLMN selected by the user cannot be achieved, finding one or more PLMNs offering access to restricted local operator service (RLOS), selecting a specific PLMN of the found one or more PLMNs among PLMNs contained in a RLOS PLMN list configured to a universal subscriber identity module (USIM) of the UE, and initiating a registration for an access to RLOS on the specific PLMN, thereby using RLOS with high quality and high security.

16 Claims, 16 Drawing Sheets

(56) References Cited

OTHER PUBLICATIONS

3rd Generation Partnership Project; Technical Specification Group Services and System Aspects; "Study on System enhancements for Provision of Access to Restricted Local Operator Services by Unauthenticated UEs (Release 15)," 3GPP TR 23.715 V0.6.1, dated Jul. 2018, 33 pages.

3rd Generation Partnership Project; Technical Specification Group Services and System Aspects; "Service aspects; Service principles (Release 16)," 3GPP TS 22.101 V16.0.0, dated Jun. 2018, 104 pages.

Digital cellular telecommunications system (Phase 2+) (GSM); Universal Mobile Telecommunications System (UMTS); LTE; "Non-Access-Stratum (NAS) functions related to Mobile Station (MS) in idle mode," ETSI TS 123 122 V15.4.0, dated Jun. 2018, 65 pages.

Intel, "Clarification on the PLMN selection mode for RLOS," S1-182637, 3GPP TSG-SA WG1 Meeting #83, West Palm Beach, Florida, USA, dated Aug. 20-24, 2018, 6 pages.

Korean Office Action in Korean Application No. 10-2019-0108481, dated Dec. 13, 2019, 12 pages (with English translation).

PCT International Search Report in International Application No. PCT/KR2019/011273, dated Dec. 27, 2019, 9 pages (with English translation).

\* cited by examiner

[FIG. 1]
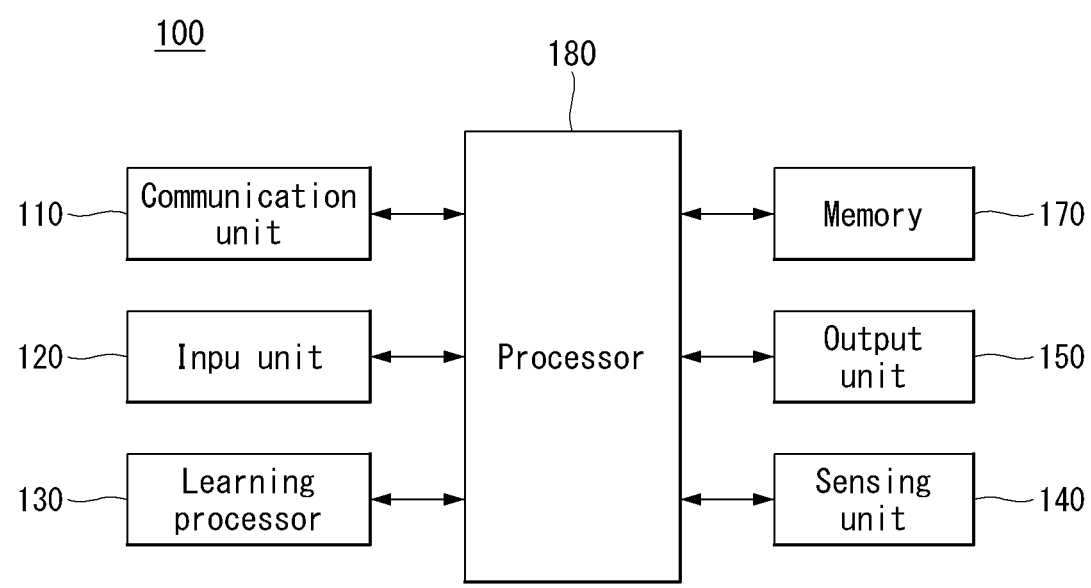

[FIG. 2]
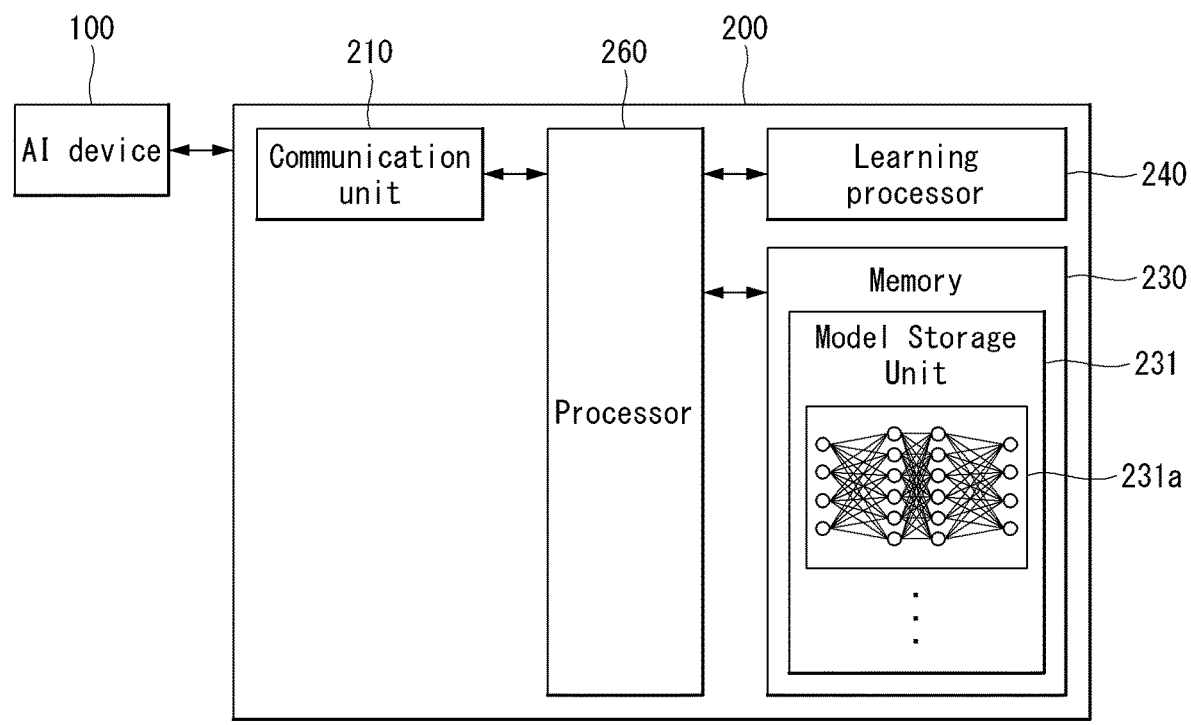

[FIG. 3]
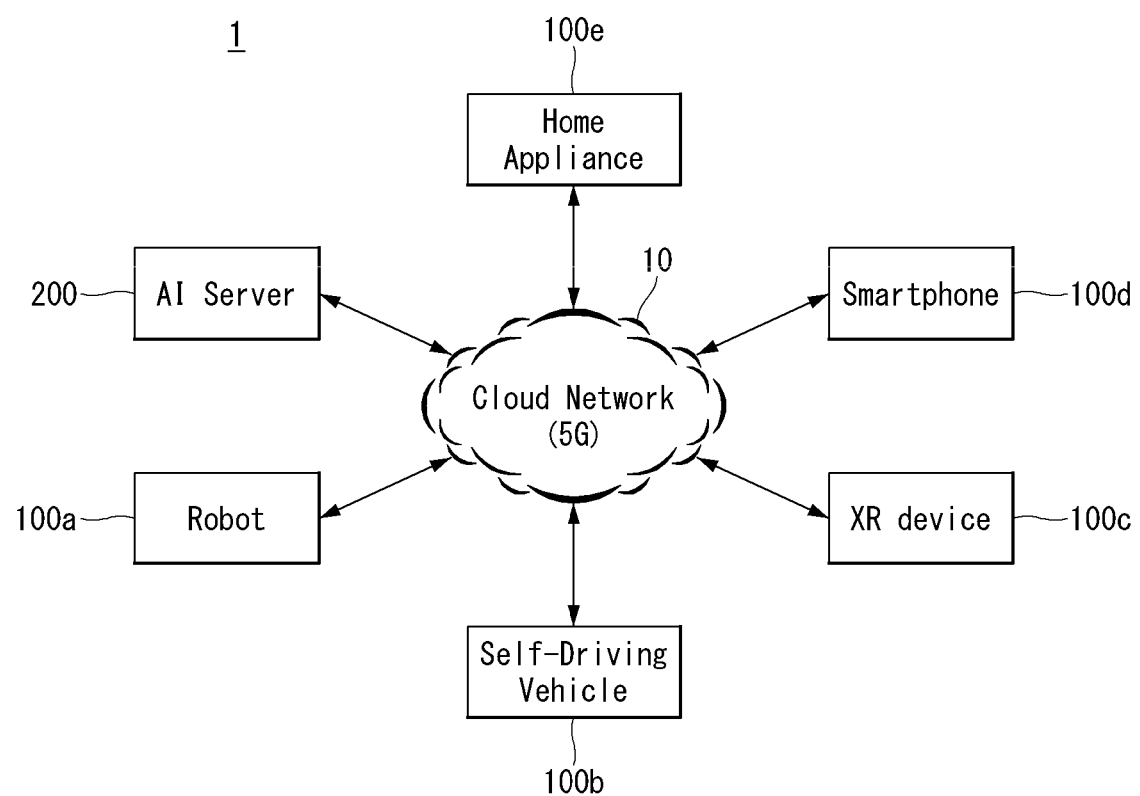

[FIG. 4]
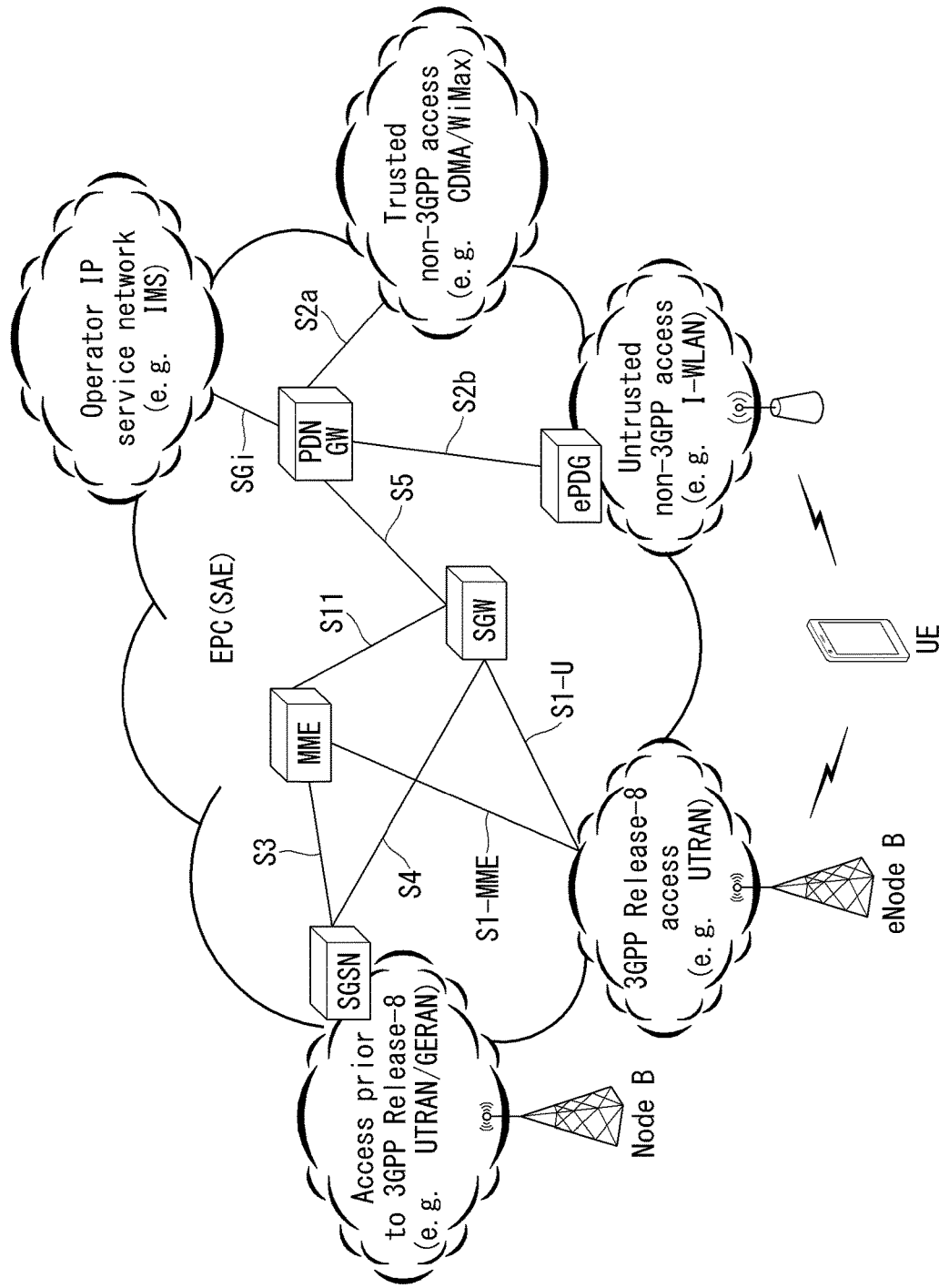

[FIG. 5]
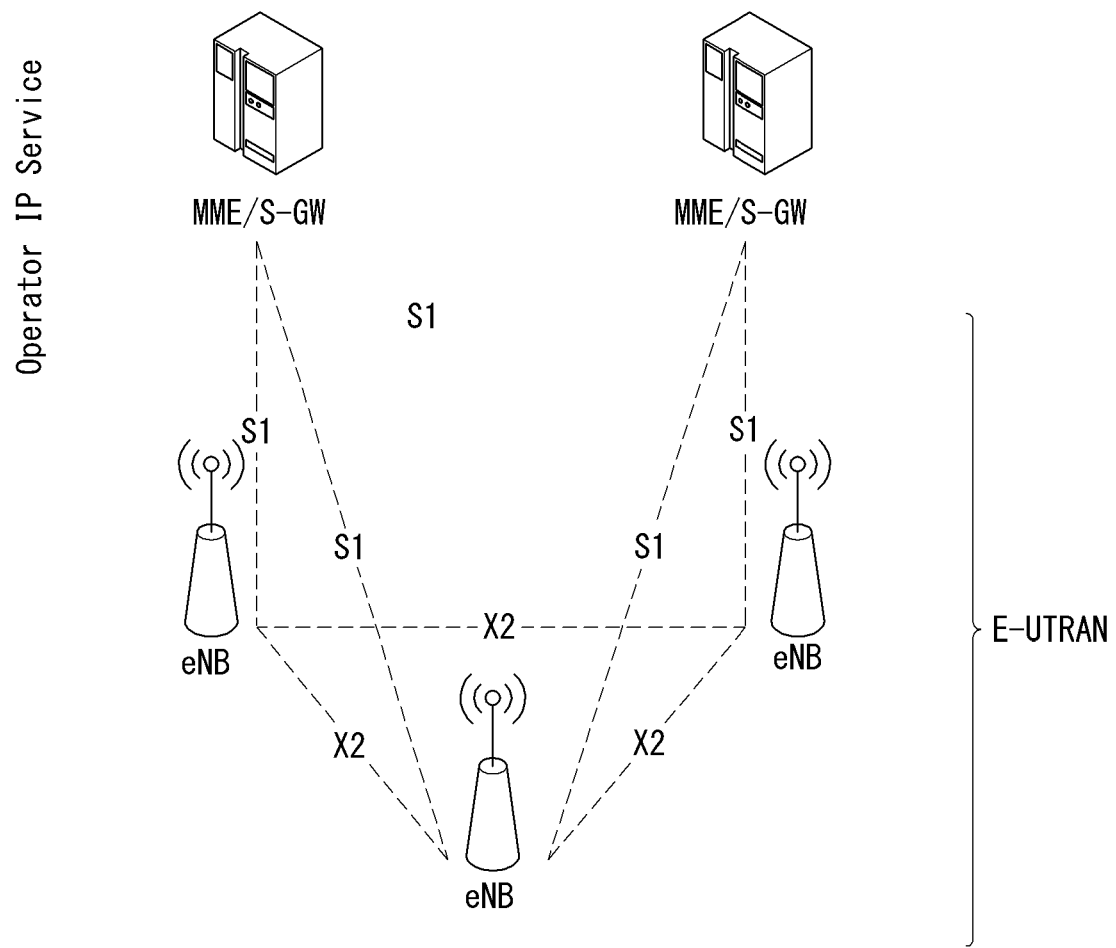

[FIG. 6]
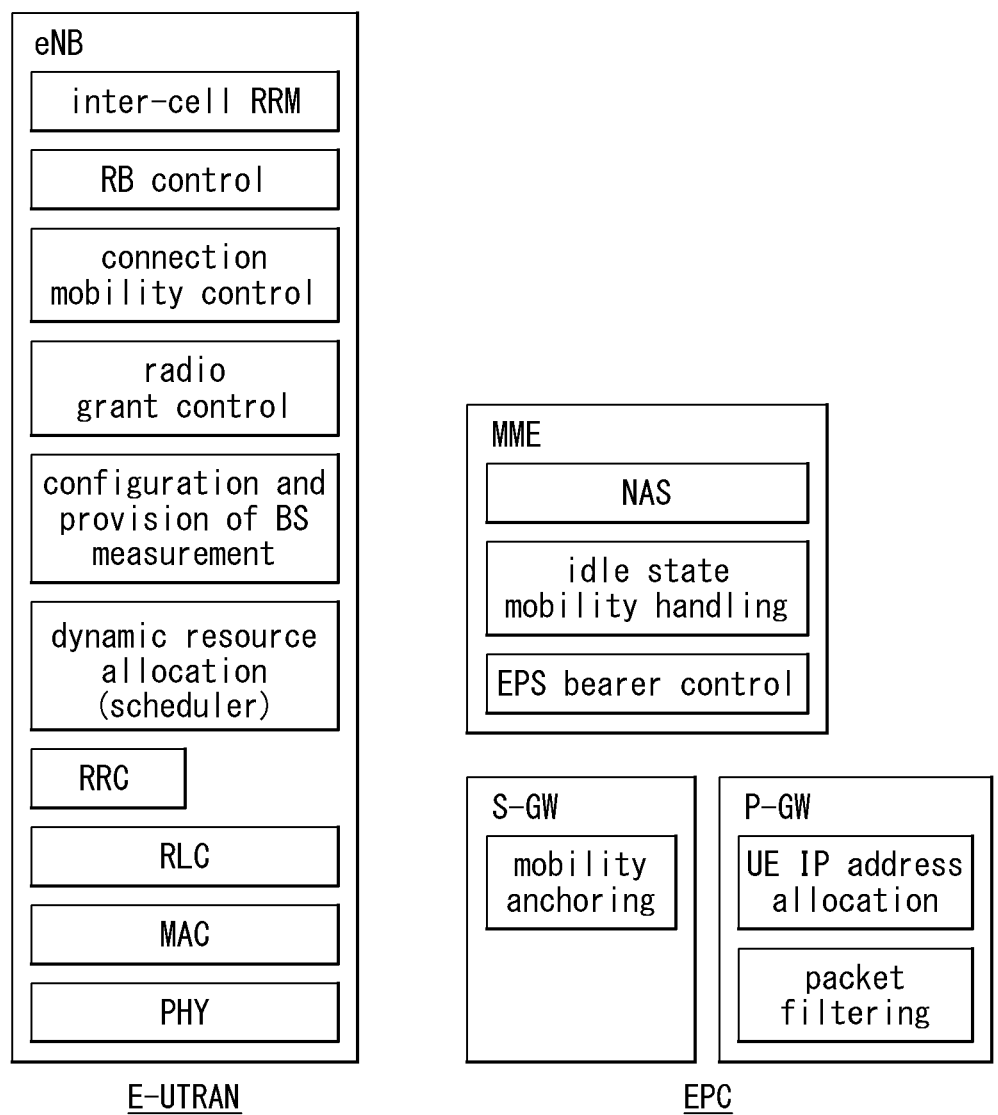

[FIG. 7]
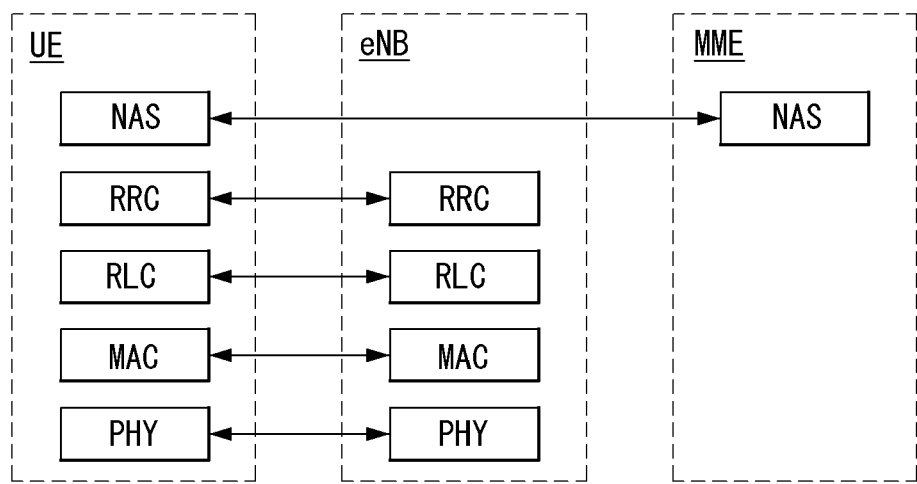

[FIG. 8]
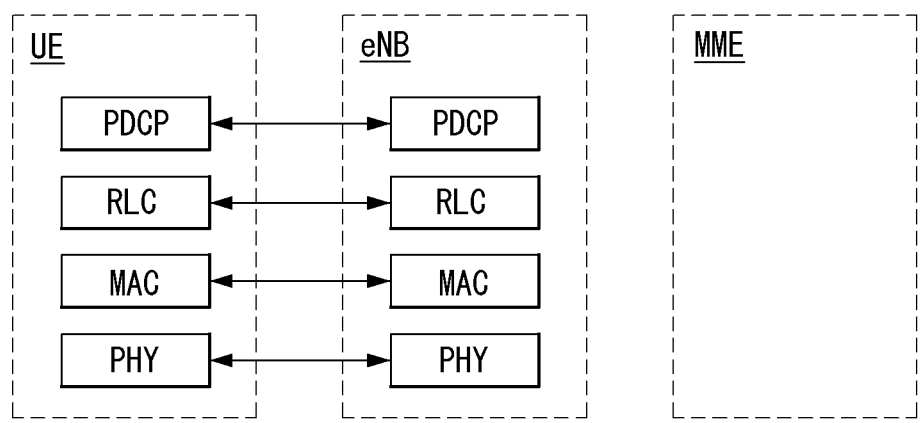

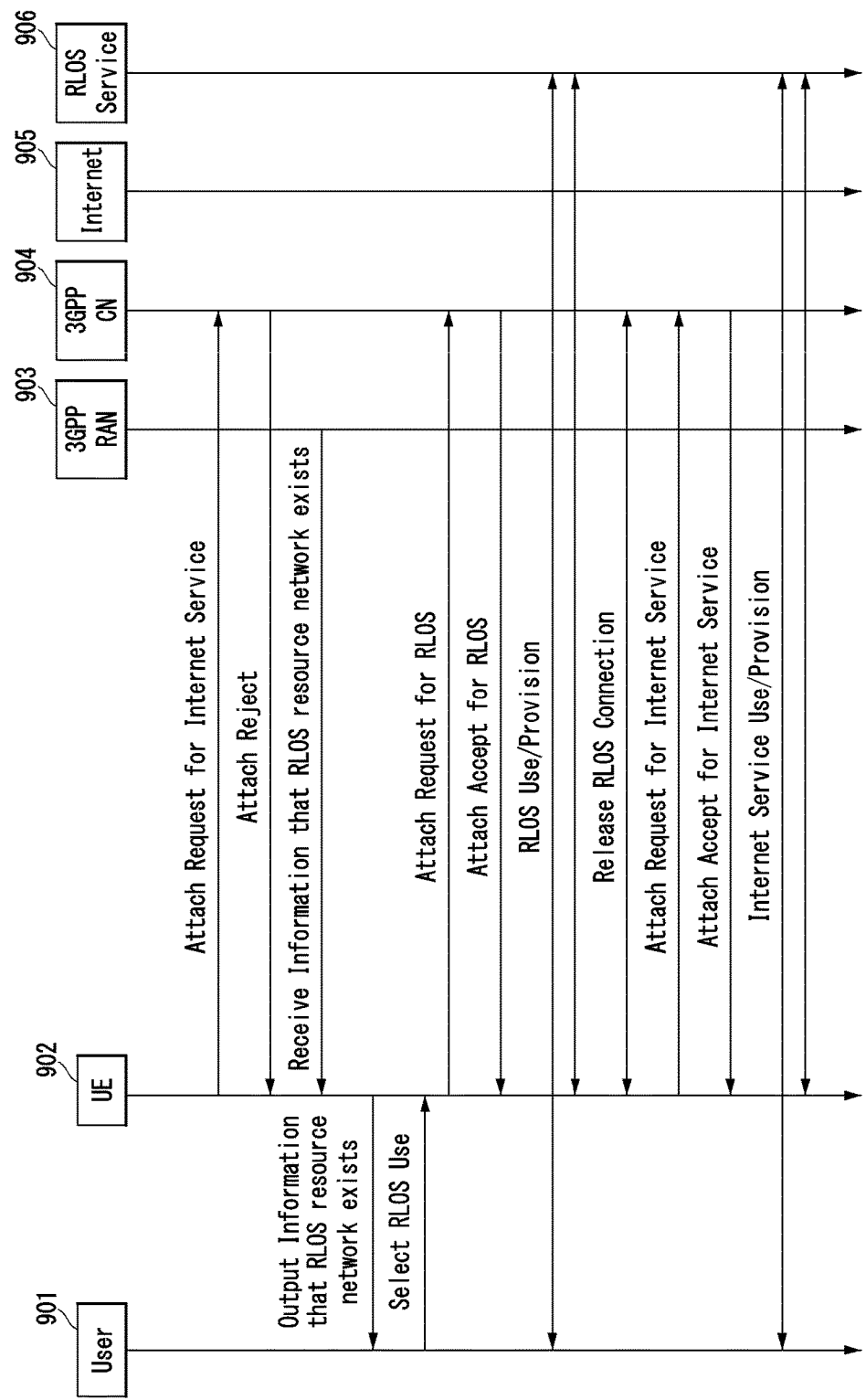
[FIG. 9]

[FIG. 10A]
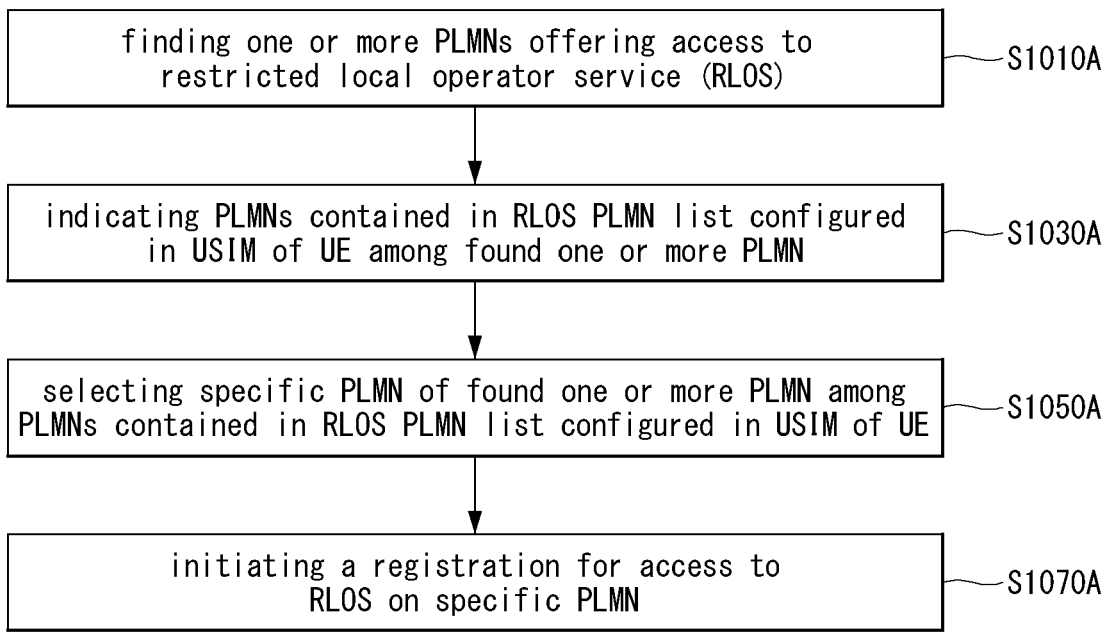
(a)

[FIG. 10B]
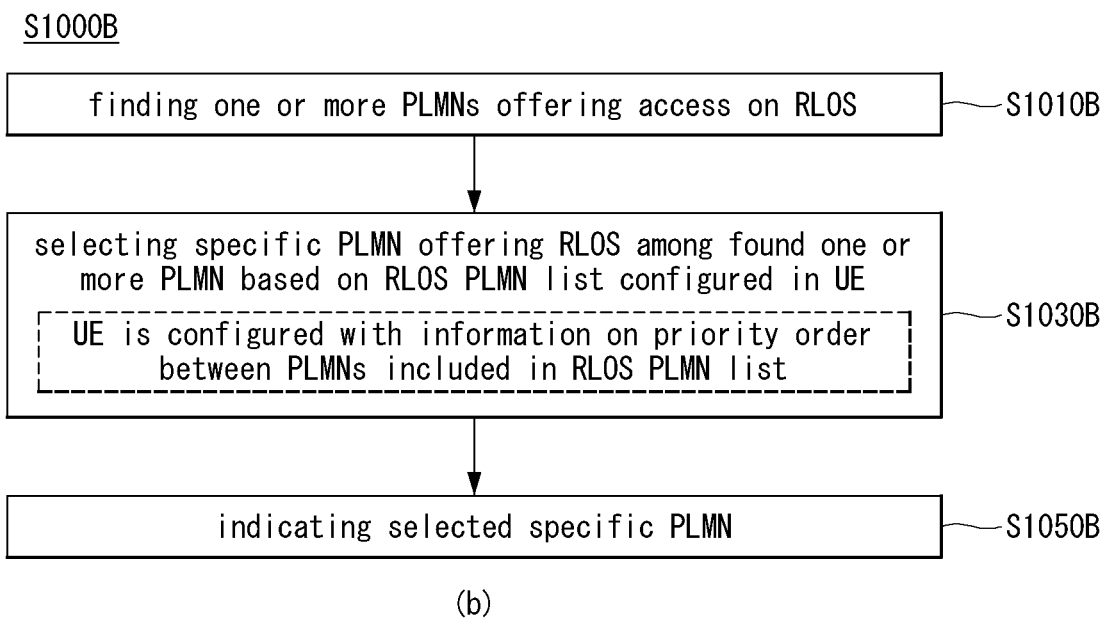
(b)

[FIG. 11]
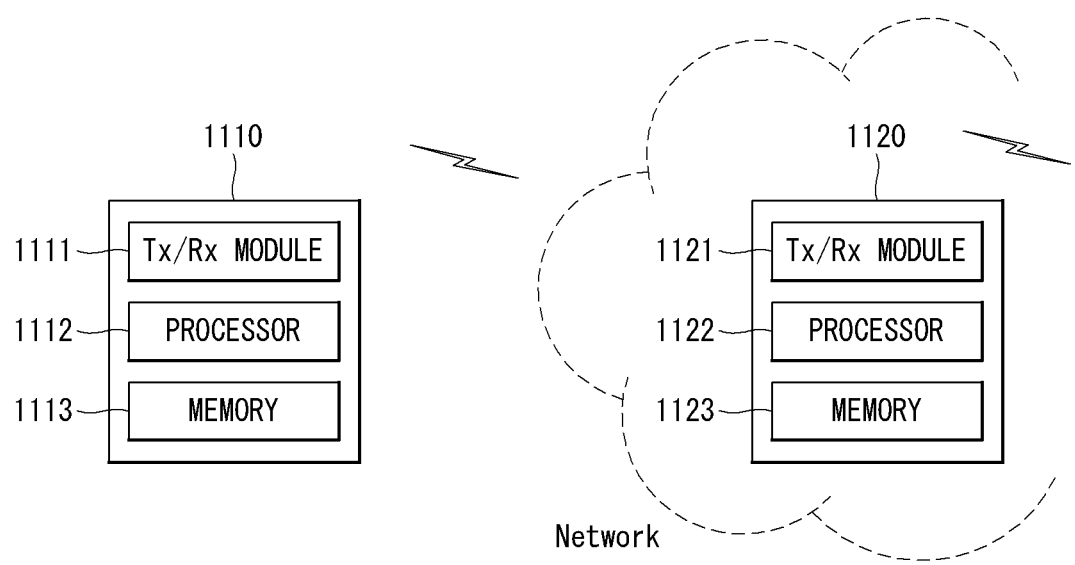

[FIG. 12]
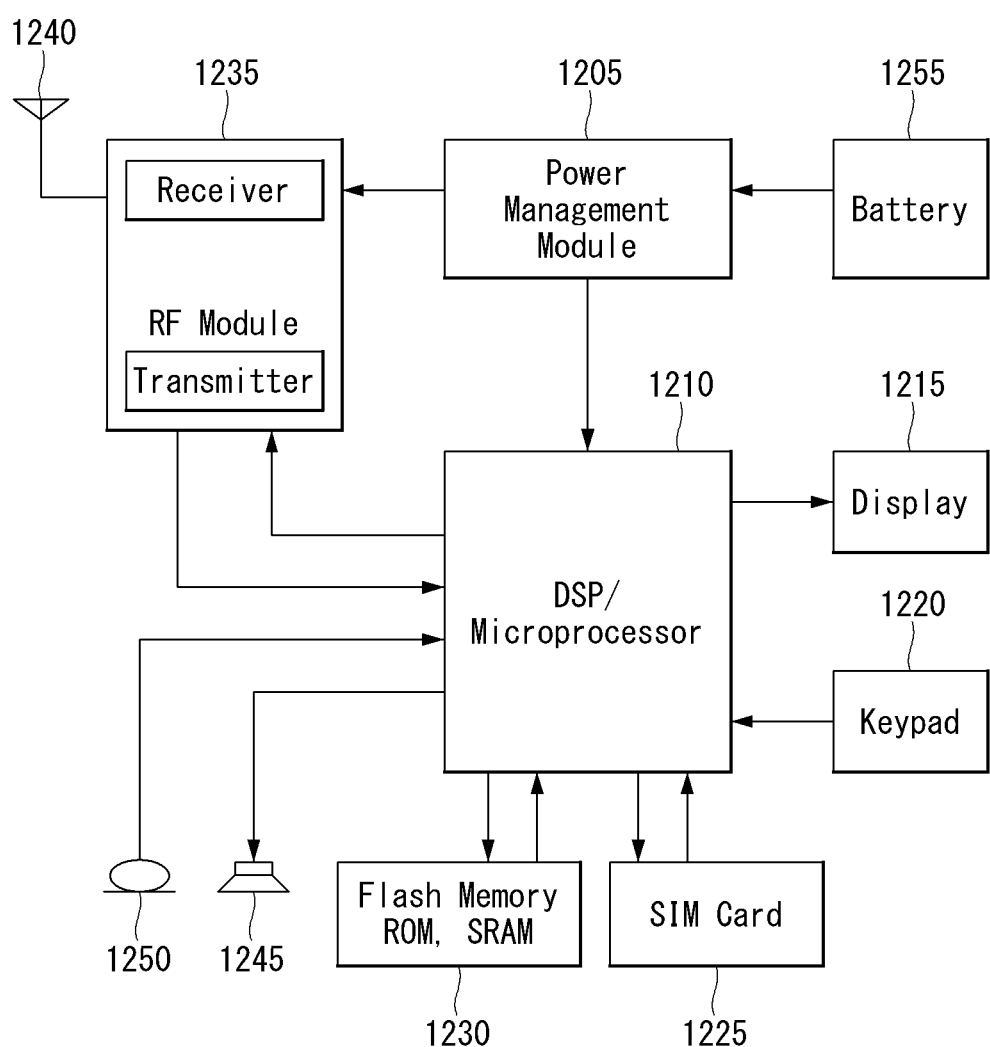

[FIG. 13]
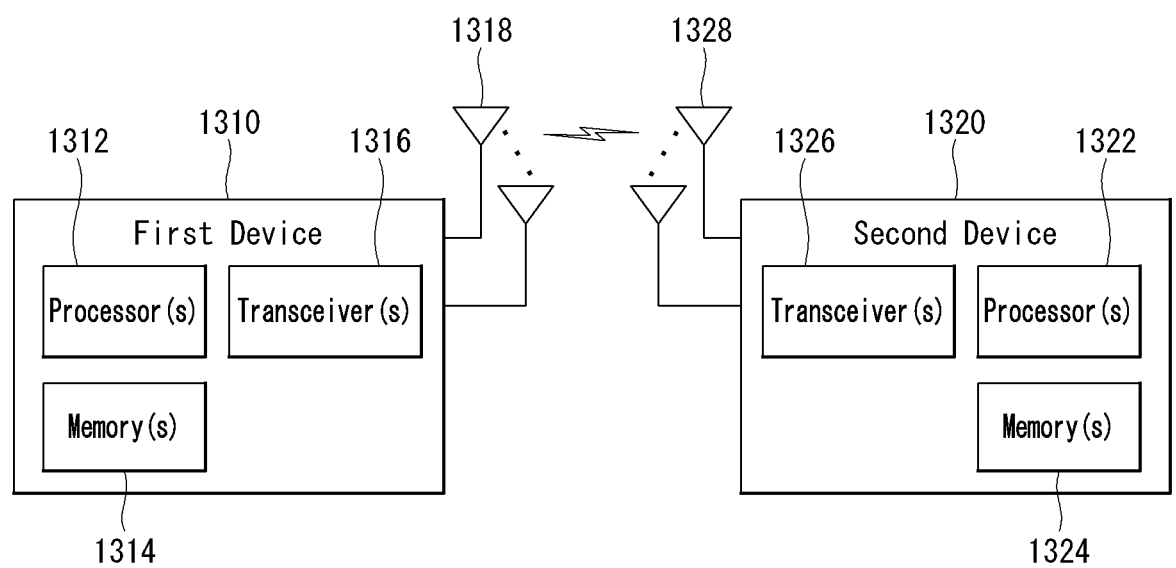

[FIG. 14]
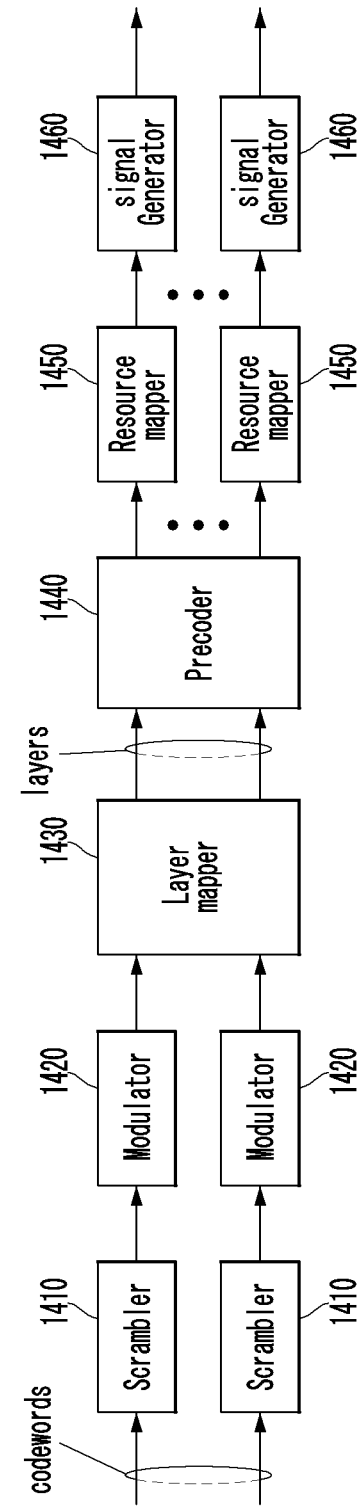

[FIG. 15]
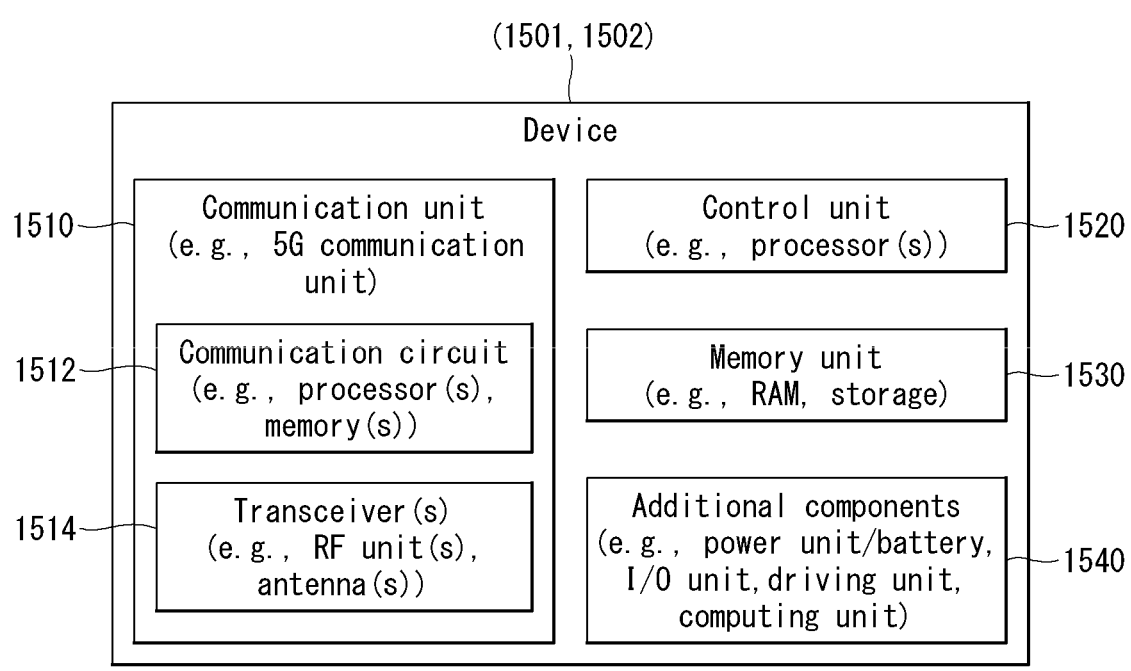

METHOD FOR SELECTING NETWORK PROVIDING RESTRICTED LOCAL OPERATOR SERVICE IN WIRELESS COMMUNICATION SYSTEM AND APPARATUS THEREOF

CROSS-REFERENCE TO RELATED APPLICATIONS

This application is based on and claims priority under 35 U.S.C. 119 to 62/725,280, filed on Aug. 31, 2018, in the USPTO, 10-2018-0107206, filed on Sep. 7, 2018, in the Korean Intellectual Patent Office, and 10-2018-0123642, filed on October 17, in the Korean Intellectual Patent Office, the disclosure of which is herein incorporated by reference in its entirety.

BACKGROUND OF THE INVENTION

Field of the Invention

The present disclosure relates to a wireless communication system, and more particularly to a method for selecting some of a plurality of public land mobile networks (PLMNs) providing a restricted local operator service and a device thereof.

Related Art

In a wireless communication system, mobile communication systems have been developed to provide voice services while ensuring activity and mobility of users. However, coverage of mobile communication systems has been extended to include data services, as well as voice services, resulting in an explosive increase in traffic and shortage of resources. To meet the demands of users expecting relatively high speed services, an advanced mobile communication system is required.

Requirements of a next-generation mobile communication system include accommodation of increased amounts of data traffic, a significant increase in a transfer rate per user terminal, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY OF THE INVENTION

An object of the present disclosure is to propose a method for efficiently selecting a public land mobile network (PLMN) in a wireless communication system and a device thereof.

Technical problems to be solved by the present disclosure are not limited by the above-mentioned technical problems, and other technical problems which are not mentioned above can be clearly understood from the following description by those skilled in the art to which the present disclosure pertains.

One general aspect of the present disclosure comprises a method for selecting, by a user equipment (UE), a public land mobile network (PLMN) in a wireless communication system, the method comprising attempting a registration on a PLMN selected by a user in a manual network selection mode; if the registration on the PLMN selected by the user fails, searching for at least one PLMN providing an Attach for a restricted local operator service (RLOS); selecting a specific PLMN of at least one PLMN searched among PLMNs included in an RLOS PLMN list configured to a universal subscriber identity module (USIM) of the UE; and initiating a registration for an Attach for an RLOS of the specific PLMN.

The initiating of the registration for the Attach for the RLOS of the specific PLMN may comprise attempting a registration for an Attach for an RLOS of a first PLMN selected among the PLMNs included in the RLOS PLMN list configured to the USIM of the UE in the searched at least one PLMN; and if the registration for the Attach for the RLOS of the first PLMN fails, attempting a registration for an Attach for an RLOS of a second PLMN selected after the first PLMN is selected among the searched at least one PLMN.

Representing the PLMNs may comprise representing the searched at least one PLMN among the PLMNs included in the RLOS PLMN list, and a PLMN that is not included in the RLOS PLMN list among the searched at least one PLMN and informs to support the RLOS among the PLMNs.

Information related to a radio access technology (RAT) allowed in each PLMN included in the RLOS PLMN list may be configured to the USIM of the UE.

Representing the PLMNs may comprise being based on information related to whether to initiate a registration procedure for an Attach for an RLOS of a remaining PLMN excluding the PLMNs included in the RLOS PLMN list from the searched at least one PLMN.

Representing the PLMNs may comprise being based on information related to whether to initiate a registration procedure for an Attach for an RLOS of the searched at least one PLMN.

Representing the PLMNs may comprise being based on information related to whether to initiate a registration procedure for an Attach for an RLOS of a PLMN included in the RLOS PLMN list configured to the USIM of the UE among the searched at least one PLMN.

Representing the PLMNs may comprise being based on information related to whether to initiate a registration procedure for the Attach for the RLOS of the specific PLMN.

The method may further comprise, after initiating the registration for the Attach for the RLOS of the specific PLMN, initiating a registration for an Attach for an RLOS of a remaining PLMN excluding the selected at least one PLMN from the PLMNs included in the RLOS PLMN list configured to the USIM of the UE among the searched at least one PLMN.

The method may further comprise searching for a plurality of PLMNs providing an Attach for an internet service; and representing information related to whether each of the searched plurality of PLMNs supports the RLOS, together with the searched plurality of PLMNs.

Another general aspect comprises a user equipment (UE) selecting a public land mobile network (PLMN) in a wireless communication system, the UE comprising a communication module; at least one processor; and at least one computer memory operably connected to the at least one processor, wherein the at least one computer memory upon execution stores instructions that allow the at least one processor to perform: attempting a registration on a PLMN selected by a user in a manual network selection mode; if the registration on the PLMN selected by the user fails, searching for at least one PLMN providing an Attach for a restricted local operator service (RLOS); selecting a specific PLMN of at least one PLMN searched among PLMNs included in an RLOS PLMN list configured to a universal subscriber identity module (USIM) of the UE; and initiating a registration for an Attach for an RLOS of the specific PLMN.

The initiating of the registration for the Attach for the RLOS of the specific PLMN may comprise attempting a registration for an Attach for an RLOS of a first PLMN selected among the PLMNs included in the RLOS PLMN list configured to the USIM of the UE in the searched at least one PLMN; and if the registration for the Attach for the RLOS of the first PLMN fails, attempting a registration for an Attach for an RLOS of a second PLMN selected after the first PLMN is selected among the searched at least one PLMN.

Representing the PLMNs may comprise representing the searched at least one PLMN among the PLMNs included in the RLOS PLMN list, and a PLMN that is not included in the RLOS PLMN list among the searched at least one PLMN and informs to support the RLOS among the PLMNs.

Information related to a radio access technology (RAT) allowed in each PLMN included in the RLOS PLMN list may be configured to the USIM of the UE.

Representing the PLMNs may comprise being based on information related to whether to initiate a registration procedure for an Attach for an RLOS of a remaining PLMN excluding the PLMNs included in the RLOS PLMN list from the searched at least one PLMN.

Representing the PLMNs may comprise being based on information related to whether to initiate a registration procedure for an Attach for an RLOS of the searched at least one PLMN.

Representing the PLMNs may comprise being based on information related to whether to initiate a registration procedure for an Attach for an RLOS of a PLMN included in the RLOS PLMN list configured to the USIM of the UE among the searched at least one PLMN.

Representing the PLMNs may comprise being based on information related to whether to initiate a registration procedure for the Attach for the RLOS of the specific PLMN.

The UE may further comprise, after initiating the registration for the Attach for the RLOS of the specific PLMN, initiating a registration for an Attach for an RLOS of a remaining PLMN excluding at least one PLMN selected by the user from the PLMNs included in the RLOS PLMN list configured to the USIM of the UE among the searched at least one PLMN.

The UE may further comprise searching for a plurality of PLMNs providing an Attach for an internet service; and representing information related to whether each of the searched plurality of PLMNs supports the RLOS, together with the searched plurality of PLMNs.

Another general aspect comprises a method for selecting, by a user equipment (UE), a public land mobile network (PLMN) in a wireless communication system, the method comprising searching for at least one PLMN providing an Attach for a restricted local operator service (RLOS); selecting a specific PLMN providing an RLOS among the searched at least one PLMN based on an RLOS PLMN list configured to the UE; and representing the selected specific PLMN, wherein the UE is previously configured with information on a priority order between PLMNs included in the RLOS PLMN list.

The method may further comprise initiating a registration for an Attach for an RLOS of at least one PLMN based on the information on the priority order between the PLMNs.

The priority order between the PLMNs may be configured based on an order described in the RLOS PLMN list.

BRIEF DESCRIPTION OF THE DRAWINGS

The accompany drawings, which are included as part of the detailed description in order to help understanding of the present disclosure, provide embodiments of the present disclosure and describe the technical characteristics of the present disclosure along with the detailed description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 is a flow chart illustrating a method of using a restricted local operator service (RLOS) by a UE according to an embodiment of the present disclosure.

FIGS. 10A and 10B are flow charts illustrating a method for selecting, by a UE, a public land mobile network (PLMN) providing a restricted local operator service (RLOS) according to an embodiment of the present disclosure.

FIG. 11 illustrates an example of a configuration of a node device applied to implementations of the present disclosure.

FIG. 12 is a block configuration diagram illustrating in detail a UE of FIG. 11.

FIG. 13 illustrates an example of a wireless device applicable to the present disclosure.

FIG. 14 illustrates an example of a signal processing circuit for a transmission signal.

FIG. 15 illustrates another example of a wireless device applicable to the present disclosure.

DETAILED DESCRIPTION OF EMBODIMENTS

Hereafter, various embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, a person skilled in the art knows that the present disclosure can be carried out without the details.

In some cases, in order to prevent a concept of the present disclosure from being ambiguous, known structures and devices may be omitted or illustrated in a block diagram format based on core function of each structure and device.

In the present disclosure, a base station refers to a terminal node of a network directly communicating with a terminal. In some embodiments, a specific operation described as being performed by the base station may be performed by an upper node of the base station. That is, it is apparent that in the network consisting of multiple network nodes including the base station, various operations performed for communication with the terminal can be performed by the base station or network nodes other than the base station. A 'base station (BS)' may be generally substituted by terms such as a fixed station, Node B, evolved-NodeB (eNB), a base transceiver system (BTS), an access point (AP), and the like. Further, a 'terminal' may be fixed or movable and be substituted by terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink (DL) means communication from the base station to the terminal, and an uplink (UL) means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help the understanding of the present disclosure, and the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Embodiments of the present disclosure may be supported by standard documents disclosed in at least one of IEEE 802, 3GPP, and 3GPP2 which are the wireless access systems. That is, steps or parts which are not described in embodiments of the present disclosure to definitely show the technical spirit of the present disclosure may be supported by the standard documents. Further, all terms disclosed in the present disclosure may be described in the standard documents.

3GPP LTE/LTE-A/NR is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an IP based packet switched core network, and an access network such as LTE and UTRAN. The EPS is a network of an evolved version of a universal mobile telecommunications system (UMTS).

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE can be called a terminal, a mobile equipment (ME), a mobile station (MS), etc. The UE can be a portable device such as a notebook computer, a cellular phone, a personal digital assistant (PDA), a smart phone, and a multimedia device, or a fixed device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): A network node in the EPS network which performs mobility management and session management functions.

Packet Data Network Gateway (PDN-GW): A network node in the EPS network which performs UE IP address allocation, packet screening and filtering, and charging data collection functions.

Serving GW (Serving Gateway): A network node in the EPS network which performs functions such as mobility anchor, packet routing, idle mode packet buffering, and triggering paging for the ME of MME.

Policy and Charging Rule Function (PCRF): A node in the EPS network which performs policy decision to dynamically apply differentiated QoS and billing policies for each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): A network in which a server (e.g., MMS server, WAP server, etc.) supporting a specific service is located.

PDN connection: A connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network. FIG. 1 illustrates a schematic structure of an evolved packet system (EPS) including an evolved packet core (EPC).

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this can be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of mega bits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, for VR games, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will be focused on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap t he benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligent robot.

A robot may be classified for industry, medical treatment, home, and military based on its use purpose or field.

A robot includes a driver including an actuator or motor, and can perform various physical operations, such as moving a robot joint. Furthermore, a movable robot includes a wheel, a brake, a propeller, etc. in a driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed, such as adaptive cruise control, a technology for automatically driving along a fixed path, a technology for automatically setting a path when a destination is set and driving, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used to supplement a real object. In contrast, unlike in the AR technology, in the MR technology, a virtual object and a real object are used as the same character.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and a signal obtained from the camera or the microphone may be called sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model configured with an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with the learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar, etc.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform the determined operation by controlling the components of the AI device 100.

To this end, the processor 180 can request, search, receive, and use data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the components of the AI device 100 in order to execute an application program stored in the memory 170. Moreover, the processor 180 may combine and operate two or more of the components included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If a part or all of the learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. Here, the cloud network 10 may be configured using the 3G network, the 4G or long term evolution (LTE) network or the 5G network.

That is, the devices 100a to 100e and 200 constituting the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least some of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or control command based on the deduced result value.

Various implementations of the AI devices 100a to 100e to which the above-described technologies are applied are described below. Herein, the AI devices 100a to 100e illustrated in FIG. 3 may be considered to be detailed implementations of the AI device 100 illustrated in FIG. 1.

AI and Robot to which the Present Disclosure is Applicable

An AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain state information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor among LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Here, the learning model may have been directly trained in the robot 100a or may have been trained in an external device, such as the AI server 200.

The robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI and Self-Driving to which the Present Disclosure is Applicable

An AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain state information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information about the environment or the object from external devices, or may receive information about the environment or object that is directly recognized from the external devices.

The self-driving vehicle 100b may perform the above operations using a learning model consisting of at least one artificial neural network. For example, the self-driving vehicle 100b may recognize a surrounding environment and object using a learning model and determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model to perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100b may perform an operation or run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

An AI technology is applied to the XR device 100c, and the XR device 100c may be implemented as a head-mount display (HIVID), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI, Robot and Self-Driving to which the Present Disclosure is Applicable

An AI technology and a self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing technique in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

An AI technology and an XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI, Self-Driving and XR to which the Present Disclosure is Applicable

An AI technology and an XR technology are applied to the self-driving vehicle 100b, and the self-driving vehicle 100b may be implemented as a mobile robot, a vehicle, an unmanned aerial vehicle, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100*b* may operate based on a control signal received through an external device, such as the XR device 100*c*, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions such as security procedures, terminal-to-network session handling, idle terminal location management, and so on.

The SGSN handles all packet data such as mobility management and authentication of the user for another 3GPP network (e.g., GPRS network).

The ePDG serves as a security node for an untrusted non-3GPP network (e.g., I-WLAN, Wi-Fi hotspot, etc.)

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 7 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

UE's Network Selection Procedure

A UE being camped on a cell is described in detail as follow.

If the UE is switched on or intends to newly access a cell, the UE performs an initial cell search procedure including, for example, obtaining time and frequency synchronizations with the cell and detecting a physical layer cell identity of the cell. To this end, the UE may receive a downlink (DL) synchronization signal from the eNB to adjust the eNB to the DL synchronization, and may obtain information of a cell identity (ID), etc. If the UE is switched on, the PLMN is selected by the NAS. For the selected PLMN, associated RAT(s) may be set. The NAS provides the UE with a list of equivalent PLMNs, that an access stratum (AS) uses for the cell selection or the cell reselection, if available.

With the cell selection, the UE searches for a suitable cell of the selected PLMN and chooses a cell to provide available services. Further, the UE tunes to a control channel of the cell.

The choosing is known as "camping on the cell".

If the UE finds a more suitable cell according to a cell reselection criteria, the UE reselects the cell and camps on the cell. If the new cell does not belong to at least one tracking area in which the UE is registered, a location registration is performed.

The purpose of camping on a cell in an idle mode may be five:

It enables the UE to receive system information from the PLMN.

When registered and if the UE want to establish an RRC connection, the UE can perform this by initially accessing the network on a control channel of a cell on which the UE is camped.

If the PLMN receives a call for the registered UE, the PLMN can know (in most cases) a set of tracking areas in which the UE is camped. Then, the PLMN can send a "paging" message for the UE on control channels of all the cells in this set of tracking areas. The UE will then receive the paging message because the UE is tuned to the control channel of the cell in one of the registered tracking areas, and the UE can respond on the control channel.

It enables the UE to receive earthquake and tsunami warning system (ETWS) and commercial mobile alert system (CMAS) notifications.

It enables the UE to receive MBMS services.

If the UE is camped on a cell, the UE regularly searches for a better cell according to the cell reselection criteria. If the better cell is found, the found cell is selected by the UE. A change of the cell may imply a change of the RAT.

For normal services, the UE camps on a suitable cell and tunes to a control channel of the cell so that the UE can:
receive system information from the PLMN
receive registration area information, for example, tracking area information from the PLMN
receive other AS and NAS information
if registered, the UE receives paging and notification messages from the PLMN and initiate transfer to a connected mode In the present disclosure, "barred cell" may refers to a cell on which a UE is not allowed to camp. "Camped on a cell" means that a UE has completed the cell selection/reselection process and has chosen a cell.

If the UE camps on a cell, the UE monitors system information and (in most cases) paging information on the corresponding cell. "Camped on any cell" means that the UE is in an idle mode and has completed the cell selection/reselection process and has chosen a cell irrespective of the PLMN identity. Further, a cell on which the UE camps is called a serving cell.

The description related to the PLMN selection is additionally described in 3GPP TS.22.011 23.122, 36.304.

Restricted Local Operator Service (RLOS)

RLOS refers to service that allows a UE to temporarily access a network and to receive the configuration when the UE cannot register with the network in a normal method or cannot receive services due to a problem of the UE or the network.

For example, if there is an error in a SIM card installed in the UE, or if the configuration of the UE is wrong, it may be impossible for the UE to normally access the network. In this case, when the UE switches to an RLOS mode and attaches to the network, the UE informs that it requests the RLOS, and the network allows the access of the UE. In this instance, the network can provide appropriate configuration to the UE.

Afterward, if the configuration is completed, the UE terminates the RLOS mode and may perform again the network Attach and service Request in a general normal mode.

As mentioned above, the RLOS means that the UE accesses the network in an emergency under abnormal conditions and receives services over limited communication. In particular, in the RLOS condition, the network provides services in a state where it cannot properly authenticate the UE performing the RLOS access.

For example, if the SIM card of the UE is wrong, the network and the UE cannot properly configure the security until information on the SIM card is modified. Thus, in order to use the RLOS, if the UE accesses the network, the UE shall attempt to access the RLOS after completely recognizing that data transmitted by the UE is not secure, i.e., is at risk.

That is, the following method has been proposed to solve this.

At switch on, when in coverage of the last registered PLMN as stored in the SIM/USIM, the UE will attach to that network.

As an option, in automatic selection mode, when no EHPLMN list is present, the UE may select the HPLMN. When the EHPLMN list is present, the UE may select the highest priority EHPLMN among the available EHPLMNs. The operator shall be able to control the UE behaviour by USIM configuration.

As an option, if the UE is in manual network selection mode at switch-on
  if the last registered PLMN is unavailable and no equivalent PLMN is available,
  and the UE finds it is in coverage of either the HPLMN or an EHPLMN
  then the UE should register on the corresponding HPLMN or EHPLMN. The UE remains in manual mode.

If the UE returns to coverage of the PLMN on which it is already registered (as indicated by the registered PLMN stored in the SIM/USIM), the UE shall perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it shall be used. The operator shall be able to control by USIM configuration whether an UE that supports this option shall follow this alternative behaviour.
  NOTE: At switch-on and at recovery from lack of coverage, a UE in automatic network selection mode can attempt registration once the RPLMN or, if the above option is applicable, the HPLMN or EHPLMN is found on an access technology.

The default behaviour for a UE is to select the last registered PLMN.

If there is no registered PLMN stored in the SIM/USIM, or if this PLMN is unavailable and no equivalent PLMN is available, or the attempted registration fails, the UE shall follow one of the following procedures for network selection:

A) Automatic network selection mode

The UE shall select and attempt registration on other PLMNs, if available and allowable, if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service;

ii) each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iii) each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iv) other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service;

v) all other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory.(see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration is achieved, the UE shall indicate the selected PLMN.

If registration cannot be achieved on any PLMN and at least one PLMN offering restricted local operator services has been found, the UE shall obtain user consent for RLOS service and use a list of default restricted local operator service PLMNs stored in the ME. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services is selected, the UE shall indicate "no service" to the user, wait until a new PLMN is detected, or new location areas or tracking areas of an allowed PLMN are found which are not in the forbidden LA or TA list(s), and then repeat the procedure.

When registration cannot be achieved, different (discontinuous) PLMN search schemes may be used in order to minimize the access time while maintaining battery life, e.g. by prioritising the search in favour of BCCH carriers which have a high probability of belonging to an available and allowable PLMN.

That is, the above method is a method that the UE obtains the user consent and attempts the RLOS service access on a network included in a separate list if the UE fails in the normal access attempt in the automatic network selection mode.

However, the above method has problems for the following reason.

Problem of consuming internal memory/processing resource of the UE because the UE additionally manages a separate list in addition to a network list managed for the normal access attempt Problem of generating additionally a service access failure time by determining whether a network included in a separate list is present or absent although the UE in the abnormal conditions shall be rapidly reconfigured through the RLOS service Problem that a separate list has to be used in spite of its low reliability even if the UE previously has the separate list because it is highly likely that the UE being in the abnormal conditions is caused by abnormal configuration information the UE has.

Accordingly, the present disclosure proposes a method that the UE rapidly accesses the network providing the RLOS service in the abnormal conditions and is reconfigured without the above-described problems.

Simply, an example of the RLOS service may include SIM card reconfiguration. The SIM card has information required to create security context between the user and the network, and calls, data services, etc. can no longer be used if an error occurs in the SIM card. In this case, after the UE has urgently accessed the RLOS service, the UE can correct the error of the SIM card and again use a normal service. In this case, the method can be processed as follows.

FIG. 9 is a flow chart illustrating a method of using a restricted local operator service (RLOS) by a UE according to an embodiment of the present disclosure.

As shown in FIG. 9, a user 901 wants to use a general internet service, and thus a UE 902 sends an Attach Request to a 3GPP CN 904 (network) via a 3GPP RAN 903.

Next, the UE and the network check whether the UE is valid, for example, verify information of a SIM card. Here, if it is assumed that authentication has failed due to an error of the SIM card, the network sends an Attach Reject to the UE. Afterwards, the UE and the network are disconnected.

Next, the UE attempt to access all networks allowed in an area in which the UE is located. However, if there is an error in the SIM card, the UE will fail to access all the networks. In this instance, the UE receives, from each cell, that each cell has a network supporting the RLOS, via SIB, etc.

Next, the UE informs the user that there is a network supporting the RLOS service.

Next, the user allows the use of the RLOS service.

Next, the UE starts an Attach procedure for the RLOS service.

Next, the network accepts the Attach for the RLOS service.

Next, the UE and the user use an RLOS service 906. For example, if a voice call is used, an RLOS counselor of the operator starts a call with the user and can inform the user about how to change configuration of the UE. If data communication is used, the configuration information of the UE can be automatically transmitted from the network to the UE Next, if the RLOS service is completed, the UE and the network release the RLOS connection.

Next, the UE starts again the Attach for using internet service provided by the internet 905. To this end, the UE sends an internet service attach request to the network.

Next, the network accepts the Attach for the internet service to the UE and provides a normal service to the UE.

Lastly, the user and the UE use the normal service.

In the above procedure, each cell can inform whether the cell supports the RLOS, via SIB, etc.

The following is a procedure of informing the UE about whether each cell (3GPP RAN) supports the RLOS via the SIB, etc.

5.2.2.7 Actions Upon Reception of the SystemInformationBlockType1 Message

Upon receiving the SystemInformationBlockType1 or SystemInformationBlockType1-BR either via broadcast or via dedicated signalling, the UE shall:

1> if the cellAccessRelatedInfoList contains an entry with the PLMN-Identity of the selected PLMN:

2> in the remainder of the procedures use plmn-IdentityList, trackingAreaCode, and cellIdentity for the cell as received in the corresponding cellAccessRelatedInfoList containing the selected PLMN;

1> if in RRC_IDLE or in RRC_CONNECTED while T311 is running; and

1> if the UE is a category 0 UE according to TS 36.306 [5]; and

1> if category0Allowed is not included in SystemInformationBlockType1:

2> consider the cell as barred in accordance with TS 36.304 [4];

1> if in RRC CONNECTED while T311 is not running, and the UE supports multi-band cells as defined by bit 31 in featureGroupindicators:

2> disregard the freqBandIndicator and multiBandInfoList, if received, while in RRC CONNECTED;

2> forward the cellIdentity to upper layers;

2> forward the trackingAreaCode to upper layers;

1> else:

2> if the frequency band indicated in the freqBandIndicator is part of the frequency bands supported by the UE and it is not a downlink only band; or 2> if the UE supports multiBandInfoList, and if one or more of the frequency bands indicated in the multiBandInfoList are part of the frequency bands supported by the UE and they are not downlink only bands:

3> forward the cellIdentity to upper layers;

3> forward the trackingAreaCode to upper layers;

3> forward the ims-Emergency Support or RLOS_Support to upper layers, if present;

3> forward the eCallOverIMS-Support to upper layers, if present;

3> if, for the frequency band selected by the UE (from freqBandIndicator or multiBandInfoList), the freqBandInfo or the multiBandInfoList-v10j0 is present and the UE capable of multiNS-Pmax supports at least one additionalSpectrumEmission in the NS-PmaxList within the freqBandInfo or multiB andInfoLi st-v10j0:

4> apply the first listed additionalSpectrumEmission which it supports among the values included in NS-PmaxList within freqBandInfo or multiBandInfolist-v10j0;

4> if the additionalPmax is present in the same entry of the selected additionalSpectrumEmission within NS-Pmax-List:
   5> apply the additionalPmax;
   4> else:
   5> apply the p-Max;
   3> else:
   4> apply the additionalSpectrumEmission in SystemInformationBlockType2 and the p-Max;
   2> else:
   3> consider the cell as barred in accordance with TS 36.304 [4]; and
   3> perform barring as if intraFreqReselection is set to notAllowed, and as if the csg-Indication is set to FALSE;

The present disclosure proposes a method capable of reducing a service disconnect time and providing normal services by allowing any UE to rapidly select and register a network capable of providing RLOS service to the UE if all registration attempts for PLMNs selected by the UE fail in a procedure in which the UE selects a network capable of providing services to the UE.

To this end, the present disclosure proposes to select a network, that the UE attempts to access in order to receive the RLOS service, in the following method and to attempt the network registration.

First Embodiment

In a first embodiment, a UE selects a network and then attempts the registration in the following order in order to register with the network capable of providing a normal service to the UE.

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service;

ii) each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iii) each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iv) other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service;

v) all other PLMN/access technology combinations in order of decreasing signal quality. It shall be possible to configure a voice capable UE so that it shall not attempt registration on a PLMN if all cells identified as belonging to the PLMN do not support the corresponding voice service.

If the UE attempts registration on the PLMN in the order described above and then does not succeed in registering on any PLMN, the UE searches whether there are PLMNs providing RLOS service among the PLMNs.

If there are PLMNs providing the RLOS service, the UE additionally searches whether there is a PLMN included in a PLMN list (RLOS PLMN list) for the RLOS service among the PLMNs.

If there is a PLMN included in the RLOS PLMN list, the UE additionally informs a user that a PLMN supporting the RLOS service has been found. If there is user consent, the UE proceeds with a registration procedure for the RLOS service on the PLMN included in the RLOS PLMN list among the found PLMNs supporting the RLOS service.

If there is no PLMN included in the RLOS PLMN list among the found PLMNs supporting the RLOS service, the UE does not perform the registration attempt on the found PLMNs supporting the RLOS service.

The following is an example of the above operation of the UE.

If registration cannot be achieved on any PLMN and at least one PLMN offering restricted local operator services has been found, the UE shall obtain user consent for RLOS service. If a user consent to the use of RLOS service, and the found PLMN offering restricted local operator service is included in the list of restricted local operator service PLMNs stored in the SIM/ME, the UE shall select the found PLMNs and try to registration for RLOS service. If the user does not consent to the use of RLOS service, the UE shall not select the found PLMNs for registration of RLOS service. If no PLMN offering restricted local operator service has been found, the UE shall not select a PLMN for registration for RLOS service. None of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

1-1 Embodiment

In addition to a process of obtaining the user consent in the first embodiment, in a 1-1 embodiment, the UE can additionally obtain information related to whether the UE is able to attempt a registration procedure for RLOS service on all the found RLOS PLMNs or information related to whether the UE is able to attempt a registration procedure for RLOS service only on a specific RLOS PLMN selected by the user.

If it is informed that the UE is able to attempt the registration procedure for RLOS service on all the found RLOS PLMNs, the UE automatically attempts the registration on each RLOS PLMN until the registration for RLOS service is successful.

If the user consents to the registration procedure for RLOS service only on some PLMNs of the RLOS PLMNs found by the UE, the UE automatically attempts the registration on each RLOS PLMN until the registration for RLOS service only on the consented PLMNs is successful.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If none of the PLMNs in the RLOS PLMN list offers restricted local operator service, and if there is a detected PLMNs which are not included in the RLOS PLMN list but offers RLOS service, the UE will ask whether user consents the RLOS service or not. If the user consents the RLOS service, the UE will start to access the RLOS PLMNs. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

Alternatively, in the above process, if a plurality of RLOS PLMNs is found, the user selects one RLOS PLMN at a time, and the UE attempts a registration for RLOS service on the selected RLOS PLMN. If the registration on the PLMN fails, when the user selects another RLOS PLMN, the UE waits for user consent for an attempt of the new RLOS PLMN each time and attempts a registration procedure for the consented PLMN only when the UE obtains the user consent each time.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If the try fails and another PLMN is available in the list, the UE shall obtain another user consent for RLOS and tries to access another PLMN. This process of user consent and trial for RLOS service repeats until there is no more PLMN in the RLOS PLMN list or the UE trial is successful. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

That is, because the RLOS service occurs in a state where security context between the UE and the network is not properly achieved, each time the UE attempts the access to a new PLMN, the UE receives the user consent each time so that the user recognizes it, or the UE attempt RLOS service access for only lists specified by the user, thereby reducing a risk on security.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If the try fails and another PLMN is available in the list, the UE shall obtain another user consent for RLOS and tries to access another PLMN. This process of user consent and trial for RLOS service repeats until there is no more PLMN in the RLOS PLMN list or the UE trial is successful. If none of the default PLMNs offers restricted local operator service, the UE shall select not a detected PLMN which is not included in the RLOS PLMN list but detected as to support RLOS service . . . i.e., trying to access RLOS service is limited to the PLMNs which is included in the RLOS PLMN list. If none are selected, the UE shall wait until a new PLMN is detected, or new location areas or tracking areas of an allowed PLMN are found which are not in the forbidden LA or TA list(s), and then repeat the procedure.

However, in the above process, in order to prevent the UE from wasting power without the need, if an RLOS PLMN list is available, the use of the RLOS PLMN list may be limited to a case where the UE finds the RLOS service PLMN.

Further, in the above process, the PLMN attempting the RLOS registration may be additionally limited to being included in the RLOS PLMN list.

According to the 1-1 embodiment, the user selects RLOS with good service quality among RLOSs and accesses only a PLMN of a predetermined operator with high security, thereby increasing the security when receiving RLOS service and normal service.

1-2 Embodiment

In the first/1-1 embodiments, priority order information for each PLMN included in a RLOS PLMN list managed by the UE may be preferably included in the RLOS PLMN list.

In this case, in a 1-2 embodiment, the UE first selects a PLMN with a high priority order and attempts to register it, if there is a plurality of PLMN candidates in a process for selecting a PLMN for registration for RLOS in order to receive RLOS service.

If registration cannot be achieved on any PLMN and at least one PLMN offering restricted local operator services has been found, the UE shall obtain user consent for RLOS service and use a list of default restricted local operator service PLMNs stored in the ME. When the UE uses the list of restricted local operator service PLMNs, the UE tries to access the PLMN in the order of priority information associated to the PLMN. I.e., the UE tries to access high priority RLOS PLMN before tries to access lower priority RLOS PLMN. In this case, the UE only tries RLOS PLMNs which is found. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

However, configuring the priority order information as described above consumes additional resources in the UE. Thus, for the purpose of efficiency of the implementation, the high priority of the PLMN may also be assumed as that it first appears in the RLOS PLMN list.

According to the 1-2 embodiment, the user can preferentially select a PLMN, that is previously configured as high security, among the plurality of PLMNs, and thus manufacturers/network service providers of the SIM card can determine in advance that which service is used to provide the RLOS to the user. Therefore, there is also an advantage in terms of service marketing.

1-3 Embodiment

RLOS service is for emergency use. Thus, it is more likely that information itself on a PLMN capable of supporting the RLOS service is unavailable for the UE.

Alternatively, even if the UE has a RLOS PLMN list, it is highly likely that this information is not up to date. Thus, it is highly likely that the UE finds a PLMN that is not included in the RLOS PLMN list but can provide the RLOS service.

Accordingly, even in this case, a method for, by the UE, stably selecting a PLMN for RLOS shall be supported.

In a 1-3 embodiment, as a procedure supporting the above method, if the UE fails in all registrations for a normal service, if the UE has a RLOS PLMN list, and if the UE searches for PLMNs included in the RLOS PLMN list and finds a PLMN, the UE attempts RLOS service registration for the PLMNs.

That is, the 1-3 embodiment illustrates an example of a procedure for selecting some PLMNs according to specific conditions in the searched PLMN list and a previously stored PLMN list.

If all the attempts for the PLMNs have failed, or if the PLMN included in the RLOS PLMN list has not been found, the UE additionally searches for the PLMN supporting the RLOS service and attempts the RLOS service registration.

That is, separately from a process for getting the user consent for attempting registration on the PLMN included in the existing RLOS PLMN list, the UE gets the user consent for the corresponding process before attempting the registration for RLOS on the PLMN not included in the RLOS PLMN list, and attempts the registration for RLOS even when there is the user consent.

If registration cannot be achieved on any PLMN, the UE shall obtain user consent for RLOS service. If the user consents for RLOS and if a list of default restricted local operator service PLMNs (RLOS PLMN list) is available, the UE tries registration for RLOS for the PLMNs in the RLOS PLMN list. If registration for RLOS service was not achieved for the PLMNs in the RLOS PLMN list or if no PLMN in the RLOS PLMN list is found, the UE shall search for PLMNs supporting RLOS service, which are not in the list of RLOS PLMN list. If such PLMNs are found, the UE requests for user consent. If the user agree RLOS registration attempt for this found PLMNs, the UE shall try RLOS registration attempt for this PLMNs. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

However, in the above process, if HPLMN of the UE constructs the RLOS PLMN list considering security threats, the HPLMN can forbid the UE from attaching to the RLOS service except PLMNs specified by the HPLMN.

In this case, even if the UE cannot register all the PLMNs included in the RLOS PLMN list and has additionally found the PLMN, outside the RLOS PLMN list, supporting the RLOS service, the HPLMN shall be able to control the RLOS registration attempt for RLOS PLMN, outside the RLOS PLMN list, additionally found by the user.

Thus, the HPLMN informs the UE of information about whether the UE can attempt access/registration for the PLMN supporting the RLOS outside the RLOS PLMN list, and the UE attempts access/registration for the additionally found PLMN supporting the RLOS outside the RLOS PLMN list only when this has been allowed.

If registration cannot be achieved on any PLMN and at least one PLMN offering restricted local operator services has been found, the UE shall obtain user consent for RLOS service and use a list of default restricted local operator service PLMNs (RLOS PLMN list) stored in the ME. If none of the default PLMNs offers restricted local operator service, and if the UE is configured to be allowed to attempt for RLOS registration/service for the PLMN not listed in the RLOS PLMN list, the UE shall select an available PLMN offering restricted local operator services and try to RLOS registration for the PLMN. If the UE is configured to be not allowed to attempt for RLOS registration/service for the PLMN not listed in the RLOS PLMN list, the UE shall not attempt for RLOS registration/service for the PLMN not listed in the RLOS PLMN list. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

Second Embodiment

If RLOS service is provided, an operator to which a UE is subscribed can limit a wireless technology that the UE can use, in order to prevent the leakage of information of the UE. That is, the home operator identifies security threats for each of wireless technologies provided by other operators, and then can specify, based on this, that which operator allows the UE to access RLOS service, and that which wireless access technology of the operator can attempt the RLOS service. This is because as each wireless access technology evolves, the vulnerabilities inherent in security are different, and because circumstances under which a network of each operator is deployed are different.

Accordingly, in the second embodiment, the present disclosure suggests that the UE manages PLMN information and RAT, i.e., radio access technology information allowed to each PLMN in addition to a RLOS PLMN list when managing the RLOS PLMN list.

In this case, the UE attempts the access to receive RLOS service for only the RAT allowed to each PLMN in each item of the RLOS PLMN list, and does not attempt the RLOS service for combinations of other PLMNs and RAT.

Third Embodiment

In a third embodiment together with the second embodiment, if a UE is in a manual network selection mode, the UE shows a user a list of searched PLMNs. In this instance, the UE can additionally show whether each PLMN supports RLOS service, in addition to the list of searched PLMNs.

If the user selects any PLMN, the UE attempts registration on the corresponding PLMN. If the registration fails, the UE checks whether the corresponding PLMN supports RLOS service. If the PLMN supports the RLOS service, the UE additionally asks the user to access the RLOS service for the PLMN. If the user accepts it, the UE additionally attempts registration for the RLOS service.

Alternatively, if the user selects a PLMN, the UE in the manual network selection mode attempts registration on the PLMN. However, if the registration fails, the UE shows PLMNs that have not been yet registered among the searched PLMNs, and attempts another registration on a PLMN selected by the user. If such a manner proceeds and the registration on all PLMNs among the searched PLMNs fails, the UE checks whether a PLMN supporting RLOS among the searched PLMNs is available or unavailable. The UE shows it to the user and attempts RLOS PLMN registration on the selected PLMN if the user selects it.

In the above process, if the UE has a RLOS PLMN list, the UE can show the user only searched PLMNs informing the support of RLOS service via SIB among the PLMNs included in the above process, and the PLMN selected by the user can operate.

In the above, the RLOS PLMN list may be previously stored in a SIM card or a ME of the UE.

Fourth Embodiment

A current network selection includes an automatic PLMN selection mode and a manual PLMN selection mode. If normal service registration for an internet service on an actually found PLMN fails even when a UE is in the automatic PLMN selection mode, the UE can perform an Attach for RLOS service only when the UE obtains user consent.

Accordingly, as another method of the present disclosure, a fourth embodiment proposes a method that if the UE in the automatic PLMN network selection mode or the manual PLMN network selection mode selects RLOS PLMN for RLOS service, the UE transitions to a new state, for example, an RLOS network selection mode, and in this state, performs the Attach for RLOS and RLOS service, and if this process ends, the UE originally returns to the automatic PLMN network selection mode or the manual PLMN network selection mode.

Further, if registration on the PLMN selected by the user in the manual mode fails, the UE additionally checks whether the PLMN selected by the corresponding user supports RLOS. If the PLMN supports RLOS, the UE additionally asks the user whether it wants to attempt RLOS. If the user selects the RLOS, the UE performs the Attach for RLOS for the corresponding PLMN. If the user does not select the RLOS, the UE does not act on a separate operation until the user selects another PLMN.

For example, the following method can be considered.

A) Automatic network selection mode

The UE shall select and attempt registration on other PLMNs, if available and allowable,if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service;

ii) each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iii) each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iv) other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service;

v) all other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory.(see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration is achieved, the UE shall indicate the selected PLMN.

If registration cannot be achieved on any PLMN and at least one PLMN offering restricted local operator services has been found, the UE shall offer the user to select one of these networks (i.e. user consent for RLOS PLMN selection is necessary). If one of these networks is selected, the UE shall switch to RLOS network selection mode and indicate the selected PLMN. If none are selected, the UE shall wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services has been found, the UE shall indicate "no service" to the user, wait until a new PLMN is detected, or new location areas or tracking areas of an allowed PLMN are found which are not in the forbidden LA or TA list(s), and then repeat the procedure.

When registration cannot be achieved, different (discontinuous) PLMN search schemes may be used in order to minimize the access time while maintaining battery life, e.g. by prioritising the search in favour of BCCH carriers which have a high probability of belonging to an available and allowable PLMN.

B) Manual Network Selection Mode

The UE shall indicate PLMNs, including "Forbidden PLMNs", which are available. If there are none, this shall also be indicated. The HPLMN of the user may provide on the USIM additional information about the available PLMNs, if this is provided then the UE shall indicate that information to the user. This information, provided as free text may include:

Preferred partner,
roaming agreement status,
supported services

Furthermore, the UE may indicate whether the available PLMNs are present on one of the PLMN selector lists (e.g. EHPLMN, User Controlled, Operator Controlled or Forbidden) as well as not being present on any of the lists.

For the purpose of presenting the names of the available PLMNs to the user, the ME shall use the USIM defined names if available or other PLMN naming rules in priority order as defined in 3GPP TS 22.101 [7] (Country/PLMN indication).

Any available PLMNs shall be presented in the following order:

i) HPLMN (if the EHPLMN list is not present); or if one or more of the EHPLMNs are available then based on an optional data field on the USIM either the highest priority available EHPLMN is to be presented to the user or all available EHPLMNs are presented to the user in priority order; if the data field is not present, then only the highest priority available EHPLMN is presented;

ii) PLMNs contained in the "User Controlled PLMN Selector" data field in the SIM/USIM (in priority order);

iii) PLMNs contained in the "Operator Controlled PLMN Selector" data field in the SIM/USIM (in priority order);

iv) other PLMN/access technology combinations with sufficient received signal level (see 3GPP TS 23.122 [3]) in random order;

v) all other PLMN/access technology combinations in order of decreasing signal strength.

If a PLMN does not support voice services then this shall be indicated to the user.

The user may select the desired PLMN and the UE shall attempt registration on this PLMN. (This may take place at any time during the presentation of PLMNs.)

If registration cannot be achieved on the selected PLMN and if the selected PLMN offers restricted local operator services, the UE shall offer the user to select RLOS network selection mode for the selected network. If the user selects RLOS network selection mode for the selected network, the UE shall switch to RLOS network selection mode and indicate the selected PLMN.

If the registration cannot be achieved on any PLMN, the UE shall indicate "No Service". The user may then select and attempt to register on another or the same PLMN following the above procedure. The UE shall not attempt to register on a PLMN which has not been selected by the user.

Once the UE has registered on a PLMN selected by the user, the UE shall not automatically register on a different PLMN unless:

i) The new PLMN is declared as an equivalent PLMN by the registered PLMN;

or, ii) The user selects automatic mode.

If a PLMN is selected but the UE cannot register on it because registration is rejected with the cause "PLMN not allowed", the UE shall add the PLMN to the "Forbidden PLMN" list (clause 3.2.2.4.1). The UE shall not re-attempt to register on that network unless the same PLMN is selected again by the user.

If a PLMN is selected but the UE cannot register for PS services on it because registration is rejected with the cause "GPRS services not allowed in this PLMN", the UE shall not re-attempt to register for E-UTRAN or UTRAN PS or GERAN PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

For requirements to restrict the access of a UE to one or several specific RATs see section 7.1.

If a PLMN is selected but the UE cannot register on it for other reasons, the UE shall, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favour of BCCH carriers of the registered PLMN.

C) RLOS network selection mode

In this mode, the UE shall attempt to register the selected PLMN offering restricted local operator services.

If the UE fails to register the selected PLMN offering restricted local operator services, the UE switches to the either automatic network selection mode or manual network selection mode, from which the UE swithched to RLOS network selection mode.

When the UE de-registers from the selected PLMN offering restricted local operator services, the UE switches to the either automatic network selection mode or manual network selection mode, from which the UE swithched to RLOS network selection mode.

When the UE leaves RLOS network selection mode, the UE shall indicate "no service" to the user.

That is, if the UE in the automatic network selection mode fails in accessing the allowed PLMN, the UE obtains the user consent for the PLMN supporting RLOS, selects an RLOS PLMN, and moves to an RLOS network selection mode. Further, the UE attempts to register on the RLOS PLMN selected in the RLOS network selection mode. If the UE successfully registers on the RLOS PLMN and then receives RLOS service to register on the RLOS PLMN, the UE again returns to the automatic or manual PLMN selection mode that the UE has used previously. To this end, before the UE switches to the RLOS network selection mode, the UE stores information about the mode that the UE has used. When the UE terminates the RLOS network selection mode, the UE can determine whether to use the automatic or manual PLMN selection mode based on the information thus stored.

If the registration on the selected RLOS PLMN fails, the UE again returns to the automatic or manual PLMN selection mode that the UE has used previously.

4-1 Embodiment

In a 4-1 embodiment, in the above process, optionally, if the registration on the selected RLOS PLMN fails, the UE additionally asks the user whether to attempt registration on other PLMN before immediately returning to the automatic mode or the manual mode. If the user selects the other RLOS PLMN, the UE can additionally attempt registration on the other RLOS PLMN. If the user does not select the other RLOS PLMN, the UE can terminate the RLOS mode and transition to another mode.

C) RLOS Network Selection Mode

In this mode, the UE shall attempt to register the selected PLMN offering restricted local operator services.

If the UE fails to register the selected PLMN offering restricted local operator services, and if the UE detects other PLMNs offering restricted local operator services, the UE shall offer the user to select one of these networks. If the user selects a PLMN offering restricted local operator services, the UE shall indicate the selected PLMN and attempt to register the selected PLMN offering restricted local operator services.

If there is no more PLMN offering restricted local operator services or if the user selects not to attempt PLMNs offering restricted local operator services, the UE switches to the either automatic network selection mode or manual network selection mode, from which the UE swithched to RLOS network selection mode.

When the UE de-registers from the selected PLMN offering restricted local operator services, the UE switches to the either automatic network selection mode or manual network selection mode, from which the UE swithched to RLOS network selection mode.

When the UE leaves RLOS network selection mode, the UE shall indicate "no service" to the user.

In the fourth and 4-1 embodiments, the present disclosure has separately specified the RLOS network selection mode, but can perform each of the depicted operations in the automatic mode or the manual mode in another implementation method.

Fifth Embodiment

According to an existing operation, if a UE fails in registration in an automatic mode and searches an RLOS PLMN, the UE obtains user consent and has attempted registration on the RLOS PLMN. However, if the UE fails in registration on the RLOS PLMN, the UE waits until a new PLMN is searched or TA/LA changes, and the UE has again attempted the RLOS registration if such an even occurs. However, in this case, if the occurring event is the new PLMN, and the UE is able to receive a normal service not the RLOS service in the new PLMN, the fact that the UE first performs the RLOS registration is disadvantageous in terms of user experience and also generates problem of additional power consumption. In the same manner, if the new event is new TA/LA entry, and the normal service is able to be provided in the TA/LA according to an existing contract of the user, it is not preferable that the UE performs the RLOS registration.

Accordingly, in the fifth embodiment, if a UE that obtains the user consent and attempts the RLOS registration fails in the RLOS registration on all PLMNs available in a current area, and if the UE enters the new TA/RA or finds the new PLMN, the UE stops attempting the RLOS registration and preferentially attempts a normal registration procedure. If the UE fails in the normal registration procedure, the UE can attempt the RLOS registration depending on a consent state of the user.

As mentioned above, if the UE fails in the normal service registration on available PLMNs in an automatic PLMN selection mode, and if the UE finds a PLMN supporting RLOS among the available PLMNs, the UE obtains user consent and attempts RLOS registration. If the UE has an RLOS PLMN list in this process, the UE attempts RLOS registration on an actually found PLMN in the RLOS PLMN list. If it is informed, via SIN, etc., that the found PLMN does not support the RLOS in this process, the UE does not attempt the RLOS registration on the PLMN. The following is an example of an operation according to the present disclosure.

3.2.2.2 AT Switch-On or Recovery from Lack of Coverage

At switch on, when in coverage of the last registered PLMN as stored in the SIM/USIM, the UE will attach to that network.

As an option, in automatic selection mode, when no EHPLMN list is present, the UE may select the HPLMN. When the EHPLMN list is present, the UE may select the highest priority EHPLMN among the available EHPLMNs. The operator shall be able to control the UE behaviour by USIM configuration.

As an option, if the UE is in manual network selection mode at switch-on
  if the last registered PLMN is unavailable and no equivalent PLMN is available,
  and the UE finds it is in coverage of either the HPLMN or an EHPLMN
  then the UE should register on the corresponding HPLMN or EHPLMN. The UE remains in manual mode.

If the UE returns to coverage of the PLMN on which it is already registered (as indicated by the registered PLMN stored in the SIM/USIM), the UE shall perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it shall be used. The operator shall be able to control by USIM configuration whether an UE that supports this option shall follow this alternative behaviour.

NOTE: At switch-on and at recovery from lack of coverage, a UE in automatic network selection mode can attempt registration once the RPLMN or, if the above option is applicable, the HPLMN or EHPLMN is found on an access technology.

The default behaviour for a UE is to select the last registered PLMN.

If there is no registered PLMN stored in the SIM/USIM, or if this PLMN is unavailable and no equivalent PLMN is available, or the attempted registration fails, the UE shall follow one of the following procedures for network selection:

A) Automatic Network Selection Mode

The UE shall select and attempt registration for other services than restricted local operator service on other PLMNs, if available and allowable,if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service;

ii) each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iii) each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iv) other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service;

v) all other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration for other services than restricted local operator services is achieved, the UE shall indicate the selected PLMN.

If registration for other services than restricted local operator services cannot be achieved on any PLMN and at least one PLMN offering restricted local operator services has been found, the UE shall obtain user consent for restricted local operator services. If the UE obtains user consent for restricted local operator service, the UE shall select and attempt registration for restricted local operator services for the found PLMNs. For the order of attempt among found PLMNs, the UE may use a list of preferred PLMNs for restricted local operator services stored in the ME If successful registration for restricted local operator services is achieved, the UE shall indicate the selected PLMN.

If registration cannot be achieved on any PLMN, the UE shall indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritising the search in favour of BCCH carriers which have a high probability of belonging to an available and allowable PLMN.

B) Manual Network Selection Mode

The UE shall indicate PLMNs, including "Forbidden PLMNs", which are available. If there are none, this shall also be indicated. The HPLMN of the user may provide on the USIM additional information about the available PLMNs, if this is provided then the UE shall indicate that information to the user. This information, provided as free text may include:

Preferred partner,
roaming agreement status,
supported services

Furthermore, the UE may indicate whether the available PLMNs are present on one of the PLMN selector lists (e.g. EHPLMN, User Controlled, Operator Controlled or Forbidden) as well as not being present on any of the lists.

For the purpose of presenting the names of the available PLMNs to the user, the ME shall use the USIM defined names if available or other PLMN naming rules in priority order as defined in 3GPP TS 22.101 [7] (Country/PLMN indication).

Any available PLMNs shall be presented in the following order:

i) HPLMN (if the EHPLMN list is not present); or if one or more of the EHPLMNs are available then based on an optional data field on the USIM either the highest priority available EHPLMN is to be presented to the user or all available EHPLMNs are presented to the user in priority order; if the data field is not present, then only the highest priority available EHPLMN is presented;

ii) PLMNs contained in the "User Controlled PLMN Selector" data field in the SIM/USIM (in priority order);

iii) PLMNs contained in the "Operator Controlled PLMN Selector" data field in the SIM/USIM (in priority order);

iv) other PLMN/access technology combinations with sufficient received signal level (see 3GPP TS 23.122 [3]) in random order;

v) all other PLMN/access technology combinations in order of decreasing signal strength.

If a PLMN does not support voice services then this shall be indicated to the user.

The user may select the desired PLMN and the UE shall attempt registration on this PLMN. (This may take place at any time during the presentation of PLMNs.)

If registration for other service than restricted local operator service cannot be achieved on the selected PLMN and the PLMN offers restricted local operator services, the UE shall obtain user consent for restricted local operator services for the selected PLMN. If user consent is obtained for restricted local operator services, the UE shall attempt registration on this PLMN for restricted local operator services.

If the registration cannot be achieved on the selected PLMN, the UE shall indicate "No Service". The user may then select and attempt to register on another or the same PLMN following the above procedure. The UE shall not attempt to register on a PLMN which has not been selected by the user.

Once the UE has registered on a PLMN selected by the user, the UE shall not automatically register on a different PLMN unless:

i) The new PLMN is declared as an equivalent PLMN by the registered PLMN;
or,
ii) The user selects automatic mode.

If a PLMN is selected but the UE cannot register on it because registration is rejected with the cause "PLMN not allowed", the UE shall add the PLMN to the "Forbidden PLMN" list (clause 3.2.2.4.1). The UE shall not re-attempt to register on that network unless the same PLMN is selected again by the user.

If a PLMN is selected but the UE cannot register for PS services on it because registration is rejected with the cause "GPRS services not allowed in this PLMN", the UE shall not re-attempt to register for E-UTRAN or UTRAN PS or GERAN PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

For requirements to restrict the access of a UE to one or several specific RATs see section 7.1.

If a PLMN is selected but the UE cannot register on it for other reasons, the UE shall, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favour of BCCH carriers of the registered PLMN.

FIGS. 10A and 10B are a flow chart illustrating a method of selecting, by a UE, a network (PLMN) providing a restricted local operator service according to an embodiment of the present disclosure.

FIGS. 10A and 10B illustrate an example of signalling between a user equipment (UE)/a base station (BS) based on the above-described proposal methods (e.g., the first, second, third, fourth, and fifth embodiments, etc.) (here, the UE/BS is merely an example and can be replaced by various devices as described in the contents of the present disclosure or as illustrated in FIGS. 11 to 15 below). FIGS. 10A and 10B are merely for convenience of explanation and not intended to limit the scope of the present disclosure. In addition, some step(s) illustrated in FIGS. 10A and 10B may be omitted depending on conditions and/or configuration, etc.

As illustrated in FIG. 10A, a UE can attempt registration on a PLMN selected by a user in a manual network selection mode in S1010A. For example, the UE may attempt registration on the PLMN selected by the user via a BS (1120, 1310, 1320, 1410, 1420, 1501 and 1502 in FIGS. 11 to 15). For example, a PLMN registration attempt operation of the UE may include a PLMN registration attempt operation of the UE related to operations of the first, second, third, fourth, and fifth embodiments. For example, in the step S1010A, an operation of the UE (1110, 1310, 1320, 1410, 1420, 1501, and 1502 in FIGS. 11 to 15) attempting registration on the PLMN through the BS (1120, 1310, 1320, 1410, 1420, 1501, and 1502 in FIGS. 11 to 15) can be implemented by a device illustrated in FIGS. 11 to 15 below. For example, referring to FIG. 11, at least one processor 1112 can control at least one Tx/Rx module 1111 and/or at least one memory 1113, etc. in order to attempt registration on the PLMN, and at least one Tx/Rx module 1111 can attempt registration on the PLMN through the BS. As another example, referring to FIG. 13, at least one processor 1312 can control at least one transceiver 1316 and/or at least one memory 1114, etc. in order to attempt registration on the PLMN, and at least one transceiver 1316 can attempt registration on the PLMN through the BS.

As illustrated in FIG. 10A, if registration on a PLMN selected by the user fails, the UE can search for at least one PLMN providing an Attach for a restricted local operator service (RLOS) in a manual network selection mode in S1030A. For example, the UE can search for at least one PLMN providing the Attach for RLOS through the BS (1120, 1310, 1320, 1410, 1420, 1501, and 1502 in FIGS. 11 to 15). For example, the PLMN search operation of the UE may include a PLMN search operation of the UE related to operations of the first, second, third, fourth, and fifth embodiments. For example, in the step S1010, an operation of the UE (1110, 1310, 1320, 1410, 1420, 1501, and 1502 in FIGS. 11 to 15) searching for the PLMN through the BS (1120, 1310, 1320, 1410, 1420, 1501, and 1502 in FIGS. 11 to 15) can be implemented by a device illustrated in FIGS. 11 to 15 below. For example, referring to FIG. 11, at least one processor 1112 can control at least one Tx/Rx module 1111 and/or at least one memory 1113, etc. in order to search for the PLMNs, and at least one Tx/Rx module 1111 can search for the PLMNs through the BS. As another example, referring to FIG. 13, at least one processor 1312 can control at least one transceiver 1316 and/or at least one memory 1114, etc. in order to search for the PLMNs, and at least one transceiver 1316 can search for the PLMNs through the BS.

The UE (1110, 1310, 1320, 1410, 1420, 1501, and 1502 in FIGS. 11 to 15) can select a specific PLMN among PLMNs included in an RLOS PLMN list configured to a universal subscriber identity module (USIM) of the UE in 51050A. For example, based on the first, second, third, fourth, and fifth embodiments, the UE can select a specific PLMN of one or more PLMNs searched among the PLMNs included in the RLOS PLMN list configured to the USIM of the UE. For example, in the step S1010, an operation of the UE (1110, 1310, 1320, 1410, 1420, 1501, and 1502 in FIGS. 11 to 15) selecting a specific PLMN of one or more PLMNs searched among the PLMNs included in the RLOS PLMN list configured to the USIM of the UE through the BS (1120, 1310, 1320, 1410, 1420, 1501, and 1502 in FIGS. 11 to 15) can be implemented by a device illustrated in FIGS. 11 to 15 below. For example, referring to FIG. 11, at least one processor 1112 can select a specific PLMN of one or more PLMNs searched among the PLMNs included in the RLOS PLMN list configured to the USIM of the UE. As another example, referring to FIG. 13, at least one processor 1312 can select a specific PLMN of one or more PLMNs searched among the PLMNs included in the RLOS PLMN list configured to the USIM of the UE.

The UE (1110, 1310, 1320, 1410, 1420, 1501, and 1502 in FIGS. 11 to 15) can initiate a registration for an Attach for an RLOS of the specific PLMN in S1070A. For example, based on the first, second, third, fourth, and fifth embodiments, the UE can obtain a selection of the user for the specific PLMN of the PLMNs. For example, in the step S1010, an operation of the UE (1110, 1310, 1320, 1410, 1420, 1501, and 1502 in FIGS. 11 to 15) initiating the registration for the Attach for RLOS of the specific PLMN through the BS (1120, 1310, 1320, 1410, 1420, 1501, and 1502 in FIGS. 11 to 15) can be implemented by a device illustrated in FIGS. 11 to 15 below. For example, referring to FIG. 11, at least one processor 1112 can control at least one Tx/Rx module 1111 and/or at least one memory 1113, etc. in order to initiate the registration for the Attach for RLOS of the specific PLMN, and at least one Tx/Rx module 1111 can initiate the registration for the Attach for RLOS of the specific PLMN through the BS. As another example, referring to FIG. 13, at least one processor 1312 can control at least one transceiver 1316 and/or at least one memory 1114, etc. in order to initiate the registration for the Attach for RLOS of the specific PLMN, and at least one transceiver 1316 can initiate the registration for the Attach for RLOS of the specific PLMN through the BS.

As illustrated in FIG. 10B, the UE can search for at least one PLMN providing an Attach for a restricted local operator service (RLOS) in S1010A. For example, the UE can search for at least one PLMN providing an Attach for RLOS through the BS (1120, 1310, 1320, 1410, 1420, 1501, and 1502 in FIGS. 11 to 15). For example, a PLMN search operation of the UE may include a PLMN search operation of the UE related to operations of the first, second, third, fourth, and fifth embodiments. For example, in the step S1010A, an operation of the UE (1110, 1310, 1320, 1410, 1420, 1501, and 1502 in FIGS. 11 to 15) searching for the PLMNs through the BS (1120, 1310, 1320, 1410, 1420, 1501, and 1502 in FIGS. 11 to 15) can be implemented by a device illustrated in FIGS. 11 to 15 below. For example, referring to FIG. 11, at least one processor 1112 can control at least one Tx/Rx module 1111 and/or at least one memory 1113, etc. in order to search for the PLMNs, and at least one Tx/Rx module 1111 can search for the PLMNs through the BS. As another example, referring to FIG. 13, at least one processor 1312 can control at least one transceiver 1316 and/or at least one memory 1114, etc. in order to search for the PLMNs, and at least one transceiver 1316 can search for the PLMNs through the BS.

The UE (1110, 1310, 1320, 1410, 1420, 1501, and 1502 in FIGS. 11 to 15) can select a specific PLMN providing RLOS among the searched at least one PLMN based on an RLOS PLMN list configured to the UE in 51030B. For example, based on the first, second, third, fourth, and fifth embodiments, the UE can select a specific PLMN included in the RLOS PLMN list configured to the UE among the searched at least one PLMN. For example, in the step S1030, an operation of the UE (1110, 1310, 1320, 1410, 1420, 1501, and 1502 in FIGS. 11 to 15) selecting a specific PLMN providing RLOS among the searched at least one PLMN based on an RLOS PLMN list configured to a universal subscriber identity module (USIM) of the UE among the searched at least one PLMN can be implemented by a device illustrated in FIGS. 11 to 15 below. For example, referring to FIG. 11, at least one processor 1112 can select a specific PLMN providing RLOS among the searched at least one PLMN based on the RLOS PLMN list configured to the UE among the searched at least one PLMN. As another example, referring to FIG. 13, at least one processor 1312 can select a specific PLMN providing RLOS among the searched at least one PLMN based on the RLOS PLMN list configured to the UE among the searched at least one PLMN. Here, the UE may be previously configured with information on a priority order between PLMNs included in the RLOS PLMN list.

The UE (1110, 1310, 1320, 1410, 1420, 1501, and 1502 in FIGS. 11 to 15) can represent a selected specific PLMN in 51050B. For example, based on the first, second, third, fourth, and fifth embodiments, the UE can represent a selected specific PLMN. For example, in the step S1030, an operation of the UE (1110, 1310, 1320, 1410, 1420, 1501, and 1502 in FIGS. 11 to 15) representing the selected specific PLMN can be implemented by a device illustrated in FIG. 12 below. For example, referring to FIGS. 11 and 12, at least one processor 1112 can display the PLMNs on a display 1215 (see FIG. 12).

As mentioned above, the above-described BS/UE signaling and operation (e.g., the first, second, third, fourth, and fifth embodiments/FIG. 10, etc.) can be implemented by a device (e.g., FIGS. 11 to 15) to be described below. For example, the BS may correspond to a network node device, and the UE may correspond to a UE device. Further, the BS may correspond to a first wireless device, and the UE may correspond to a second wireless device, and vice versa.

For example, the above-described BS/UE signaling and operation (e.g., the first, second, third, fourth, and fifth embodiments/FIG. 10, etc.) may be processed by one or more processors 1112, 1122, 1312, and 1322 illustrated in FIGS. 11 to 15. The above-described BS/UE signaling and operation (e.g., the first, second, third, fourth, and fifth embodiments/FIG. 10, etc.) may also be stored in a memory (e.g., one or more memories 1113, 1123, 1314, and 1324 in FIGS. 11 and 13) in the form of a command/program (e.g. instruction, executable code) for driving at least one processor (e.g. 1112, 1122, 1312, and 1322) illustrated in FIGS. 11 to 15.

Overview of Device to which the Present Disclosure is Applicable

FIG. 11 illustrates an example of a configuration of a node device applied to implementations of the present disclosure.

Referring to FIG. 11, a network node device 1120 according to an exemplary embodiment may include a transceiver 1121, a processor 1122, and a memory 1123. The transceiver 1121 may be called a radio frequency (RF) unit. The transceiver 1121 may be configured to transmit various signals, data, and information to an external device and receive various signals, data, and information from the external device. The network node device 1120 may be connected to the external device wirelessly and/or wiredly. The transceiver 1121 may be divided into a transmitter and a receiver. The processor 1122 may control overall operations of the network node device 1120 and may be configured to perform a function of computing and processing information, etc. that will be transmitted and received between the network node device 1120 and the external device. In addition, the processor 1122 may be configured to perform a network node operation proposed in the present disclosure. The processor 1122 may control the transceiver 1121 to transmit data or a message to a UE 1110 or other network node according to proposals of the present disclosure. The memory 1123 may store computed or processed information, etc. for a predetermined time and may be replaced by components such as a buffer.

Further, referring to FIG. 11, a UE 1110 according to an exemplary embodiment may include a transceiver 1111, a processor 1112, and a memory 1113. The transceiver 1111 may be called a radio frequency (RF) unit. The transceiver 1111 may be configured to transmit various signals, data, and information to an external device and receive various signals, data, and information from the external device. The UE 1110 may be connected to the external device wirelessly and/or wiredly. The transceiver 1111 may be divided into a transmitter and a receiver. The processor 1112 may control overall operations of the UE 1110 and may be configured to perform a function of computing and processing information, etc. that will be transmitted and received between the UE 1110 and the external device. In addition, the processor 1112 may be configured to perform a UE operation proposed in the present disclosure. The processor 1112 may control the transceiver 1111 to transmit data or a message to a UE 1110 or other network node according to proposals of the present disclosure. The memory 1113 may store computed or processed information, etc. for a predetermined time and may be replaced by components such as a buffer.

The detailed configurations of the UE 1110 and the network node device 1120 can be implemented such that the descriptions described in various embodiments of the present disclosure are independently applied, or two or more embodiments are simultaneously applied, and duplicate description is omitted for clarity.

FIG. 12 is a block configuration diagram illustrating in detail a UE of FIG. 11.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (which is optional), a speaker 1245, and a microphone 1250. The UE may also include a single antenna or multiple antennas.

The processor 1210 implements functions, processes, and/or methods proposed above. Layers of a radio interface protocol may be implemented by the processor 1210.

The memory 1230 is connected to the processor 1210 and stores information related to operations of the processor 1210. The memory 1230 may be inside or outside the processor 1210 and may be connected to the processors 1210 through various well-known means.

A user inputs instructional information, such as a telephone number, for example, by pushing (or touching) buttons of the keypad 1220 or by voice activation using the microphone 1250. The processor 1210 receives and processes the instructional information to perform an appropriate function, such as to dial the telephone number. Operational data may be extracted from the SIM card 1225 or the memory 1230. Further, the processor 1210 may display instructional information or operational information on the display 1215 for the user's reference and convenience.

The RF module 1235 is connected to the processor 1210 and transmits and/or receives an RF signal. The processor 1210 forwards instructional information to the RF module 1235 in order to initiate communication, for example, transmit a radio signal configuring voice communication data. The RF module 1235 includes a receiver and a transmitter to receive and transmit the radio signal. The antenna 1240 functions to transmit and receive the radio signal. Upon reception of the radio signal, the RF module 1235 may transfer a signal to be processed by the processor 1210 and convert the signal into a baseband. The processed signal may be converted into audible or readable information output via the speaker 1245.

Example of Communication System to which the Present Disclosure is Applied

FIG. 13 illustrates an example of a wireless device applicable to the present disclosure.

Referring to FIG. 13, a first wireless device 1310 and a second wireless device 1320 may transmit and receive radio signals through various radio access technologies (e.g., LTE, NR, etc.).

The first wireless device 1310 may include at least one processor 1312 and at least one memory 1314, and further include at least one transceiver 1316 and/or at least one antenna 1318. The processor 1312 may control the memory 1314 and/or the transceiver 1316 and may be configured to implement the descriptions, functions, procedures, proposals, methods, and/or operational flow charts described in the present disclosure. For example, the processor 1312 may process information in the memory 1314 to generate first information/signals, and then transmit radio signals including the first information/signals through the transceiver 1316. The processor 1312 may receive radio signals including second information/signals through the transceiver 1316, and then store in the memory 1314 information obtained by processing the second information/signals. The memory 1314 may be connected to the processor 1312 and may store a variety of information related to operations of the processor 1312. For example, the memory 1314 may store software code including commands for performing some or all of processes controlled by the processor 1312 or for performing the descriptions, functions, procedures, proposals, methods, and/or operational flow charts described in the present disclosure. Here, the processor 1312 and the memory 1314 may be a part of a communication modem/circuit/chip designed to implement radio communication technologies (e.g., LTE, NR, etc.). The transceiver 1316 may be connected to the processor 1312 and transmit and/or receive radio signals through at least one antenna 1318. The transceiver 1316 may include a transmitter and/or a receiver. The transceiver 1316 may be interchangeably used with a radio frequency (RF) unit. In the present disclosure, the wireless device may represent a communication modem/circuit/chip.

The second wireless device 1320 may include at least one processor 1322 and at least one memory 1324, and further include at least one transceiver 1326 and/or at least one antenna 1328. The processor 1322 may control the memory 1324 and/or the transceiver 1326 and may be configured to implement the descriptions, functions, procedures, proposals, methods, and/or operational flow charts described in the present disclosure. For example, the processor 1322 may process information in the memory 1324 to generate third information/signals, and then transmit radio signals including the third information/signals through the transceiver 1326. The processor 1322 may receive radio signals including fourth information/signals through the transceiver 1326, and then store in the memory 1324 information obtained by processing the fourth information/signals. The memory 1324 may be connected to the processor 1322 and may store a variety of information related to operations of the processor 1322. For example, the memory 1324 may store software code including commands for performing some or all of processes controlled by the processor 1322 or for performing the descriptions, functions, procedures, proposals, methods, and/or operational flow charts described in the present disclosure. Here, the processor 1322 and the memory 1324 may be a part of a communication modem/circuit/chip designed to implement radio communication technologies (e.g., LTE, NR, etc.). The transceiver 1326 may be connected to the processor 1322 and transmit and/or receive radio signals through at least one antenna 1328. The transceiver 1326 may include a transmitter and/or a receiver. The transceiver 1326 may be interchangeably used with an RF unit. In the present disclosure, the wireless device may represent a communication modem/circuit/chip.

Hardware elements of the wireless devices 1310 and 1320 will be described in more detail below. One or more protocol layers may be implemented by, without being limited to, one or more processors 1312 and 1322. For example, the one or more processors 1312 and 1322 may implement one or more layers (e.g., functional layers such as PHY, MAC, RLC, PDCP, RRC, and SDAP). The one or more processors 1312 and 1322 may create one or more protocol data units (PDUs) and/or one or more service data unit (SDUs) according to the descriptions, functions, procedures, proposals, methods, and/or operational flow charts described in the present disclosure. The one or more processors 1312 and 1322 may create messages, control information, data, or information according to the descriptions, functions, procedures, proposals, methods, and/or operational flow charts described in the present disclosure. The one or more processors 1312 and 1322 may create signals (e.g., baseband signals) including PDUs, SDUs, messages, control information, data, or information according to the descriptions, functions, procedures, proposals, methods, and/or operational flow charts described in the present disclosure and provide the created signals to the one or more transceivers 1316 and 1326. The one or more processors 1312 and 1322 may receive the signals (e.g., baseband signals) from the one or more transceivers 1316 and 1326 and acquire the PDUs, SDUs, messages, control information, data, or information according to the descriptions, functions, procedures, proposals, methods, and/or operational flow charts described in the present disclosure.

The one or more processors 1312 and 1322 may be referred to as controllers, microcontrollers, microprocessors, or microcomputers. The one or more processors 1312 and 1322 may be implemented by hardware, firmware, software, or a combination thereof. As an example, at least one application specific integrated circuit (ASIC), at least one digital signal processor (DSP), at least one digital signal processing device (DSPD), at least one programmable logic device (PLD), or at least one field programmable gate array (FPGA) may be included in the one or more processors 1312 and 1322. The descriptions, functions, procedures, proposals, methods, and/or operational flow charts described in the present disclosure may be implemented using firmware or software, and the firmware or software may be configured to include modules, procedures, functions, etc. The firmware or software configured to perform the descriptions, functions, procedures, proposals, methods, and/or operational flow charts described in the present disclosure may be included in the one or more processors 1312 and 1322 or stored in the one or more memories 1314 and 1324 and may be driven by the one or more processors 1312 and 1322. The descriptions, functions, procedures, proposals, methods, and/or operational flow charts described in the present disclosure may be implemented using firmware or software in the form of code, commands, and/or a set of commands.

The one or more memories 1314 and 1324 may be connected to the one or more processors 1312 and 1322 and store various types of data, signals, messages, information, programs, codes, instructions, and/or commands. The one or more memories 1314 and 1324 may be configured by a read-only memory (ROM), a random access memory (RAM), an electrically erasable programmable read-only memory (EPROM), a flash memory, a hard drive, a register, a cash memory, a computer-readable storage medium, and/or combinations thereof. The one or more memories 1314 and 1324 may be located inside and/or outside the one or more processors 1312 and 1322. The one or more memories 1314 and 1324 may be connected to the one or more processors 1312 and 1322 through various technologies such as wired or wireless connection.

The one or more transceivers 1316 and 1326 may transmit, to at least one other device, user data, control information, radio signals/channels, etc. mentioned in the methods and/or operational flow charts, etc. of the present disclosure. The one or more transceivers 1316 and 1326 may receive, from at least one other device, user data, control information, radio signals/channels, etc. mentioned in the descriptions, functions, procedures, proposals, methods, and/or operational flow charts described in the present disclosure. For example, the one or more transceivers 1316 and 1326 may be connected to the one or more processors 1312 and 1322 and transmit and receive radio signals. For example, the one or more processors 1312 and 1322 may control the one or more transceivers 1316 and 1326 to transmit user data, control information, or radio signals to at least one other device. The one or more processors 1312 and 1322 may control the one or more transceivers 1316 and 1326 to receive user data, control information, or radio signals from at least one other device. The one or more transceivers 1316 and 1326 may be connected to the one or more antennas 1318 and 1328, and the one or more transceivers 1316 and 1326 may be configured to transmit and receive user data, control information, radio signals/channels, etc., mentioned in the descriptions, functions, procedures, proposals, methods, and/or operational flow charts described in the present disclosure, through the one or more antennas 1318 and 1328. In the present disclosure, the one or more antennas may be a plurality of physical antennas or a plurality of logical antennas (e.g., antenna ports). The one or more transceivers 1316 and 1326 may convert the received radio signals/channels etc. from RF band signals into baseband signals, in order to process the received user data, control information, radio signals/channels, etc. using the one or more processors 1312 and 1322. The one or more transceivers 1316 and 1326 may convert the user data, control information, radio signals/channels, etc. processed using the one or more processors 1312 and 1322 from the base band signals into the RF band signals. To this end, the one or more transceivers 1316 and 1326 may include (analog) oscillators and/or filters.

Example of Signal Processing Circuit to which the Present Disclosure is Applied

FIG. 14 illustrates an example of a signal processing circuit for a transmission signal.

Referring to FIG. 14, a signal processing circuit 1400 may include a scrambler 1410, a modulator 1420, a layer mapper 1430, a precoder 1440, a resource mapper 1450, and a signal generator 1460. An operation/function of FIG. 14 may be performed by, without being limited to, the processors 1312 and 1322 and/or the transceivers 1316 and 1326 of FIG. 13. Hardware elements of FIG. 14 may be implemented in the processors 1312 and 1322 and/or the transceivers 1316 and 1326 of FIG. 13. For example, blocks 1410 to 1460 may be implemented in the processors 1312 and 1322 of FIG. 13. Further, the blocks 1410 to 1450 may be implemented in the processors 1312 and 1322 of FIG. 13, and the block 1460 may be implemented in the transceivers 1316 and 1326 of FIG. 13.

The codeword may be converted into a radio signal via the signal processing circuit 1400 of FIG. 14. Here, the codeword is an encoded bit sequence of an information block. The information block may include a transfer block (e.g., UL-SCH transfer block, DL-SCH transfer block, etc.). The radio signal may be transmitted over various physical channels (e.g., PUSCH, PDSCH, etc.).

More specifically, the codeword may be converted into a bit sequence scrambled by the scrambler 1410. A scramble sequence used for scrambling is generated based on an initialization value, and the initialization value may include ID information, etc. of a wireless device. The scrambled bit sequence may be modulated to a modulation symbol sequence by the modulator 1420. A modulation scheme may include pi/2-BPSK (pi/2-Binary Phase Shift Keying), m-PSK (m-Phase Shift Keying), m-QAM(m-Quadrature Amplitude Modulation), and the like. A complex-valued modulation symbol sequence may be mapped to one or more transfer layers by the layer mapper 1430. Modulation symbols of each transfer layer may be mapped (precoded) to corresponding antenna port(s) by the precoder 1440. An output z of the precoder 1440 may be obtained by multiplying an output y of the layer mapper 1430 by a precoding matrix W of N×M, where N is the number of antenna ports, and M is the number of transfer layers. The precoder 1440 may perform a transform precoding (e.g., DFT transform) on complex-valued modulation symbols and then perform a precoding on them. Alternatively, the precoder 1440 may perform the precoding on the complex-valued modulation symbols without performing the transform precoding.

The resource mapper 1450 may map modulation symbols of each antenna port to time-frequency resources. The time-frequency resources may include a plurality of symbols (e.g., CP-OFDMA symbols, DFT-s-OFDMA symbols) in a time domain and include a plurality of subcarriers in a frequency domain. The signal generator 1460 may generate a radio signal from the mapped modulation symbols, and the generated radio signal may be transmitted to another device over each antenna. To this end, the signal generator 1460 may include an inverse fast Fourier transform (IFFT) module, a cyclic prefix (CP) inserter, a digital-to-analog converter (DAC), a frequency uplink converter, and the like.

A signal processing process for a reception signal in the wireless device may be performed in the reverse of the signal processing process of FIG. 14. For example, the wireless device (e.g., 140, 200 of FIG. 13) may receive a radio signal from the outside through the antenna port/transceiver. The received radio signal may be converted into a baseband signal though a signal restorer. To this end, the signal restorer may include a frequency downlink converter, an analog-to-digital converter (ADC), a CP remover, and a fast Fourier transform module (FFT). Afterwards, the baseband signal may be restored to a codeword by going through a resource de-mapper process, a post coding process, a demodulation process, and a de-scramble process. The codeword may be restored to an original information block by going through the decoding. Thus, a signal processing circuit (not shown) for a reception signal may include a signal restorer, a resource de-mapper, a post coder, a demodulator, a de-scrambling, and a decoder.

Example of Using Wireless Device to which the Present Disclosure is Applied

FIG. 15 illustrates another example of a wireless device applicable to the present disclosure.

The wireless device of FIG. 15 may be implemented in various forms according to a use-case/service.

Referring to FIG. 15, wireless devices 1501 and 1502 may correspond to the wireless devices 1310 and 1320 of FIG. 13 and may consist of various elements, components, units/portions, and/or modules. For example, each of the wireless devices 1501 and 1502 may include a communication unit 1510, a controller 1520, a memory 1530, and an additional component 1540. The communication unit 1510 may include a communication circuit 1512 and transceiver(s) 1514. For example, the communication circuit 1512 may include the one or more processors 1312 and 1322 and/or the one or more memories 1314 and 1324 of FIG. 13. For example, the transceiver(s) 1514 may include the one or more transceivers 1316 and 1326 and/or the one or more antennas 1318 and 1328 of FIG. 13. The controller 1520 is electrically connected to the communication unit 1510, the memory 1530, and the additional component 1540 and controls overall operation of the wireless devices. For example, the controller 1520 may control an electric/mechanical operation of the wireless device based on program/code/command/information stored in the memory 1530. The controller 1520 may transmit information stored in the memory 1530 to the outside (e.g., other communication devices) over a wireless/wired interface via the communication unit 1510, or store, in the memory 1530, information received over the wireless/wired interface from the outside (e.g., other communication devices) via the communication unit 1510.

The additional component 1540 may be variously configured according to types of wireless devices. For example, the additional component 1540 may include at least one of a power unit/battery, an input/output (I/O) unit, a driver, and a computing unit. The wireless device may be implemented in the form of, without being limited to, the robot 100*a* (see FIG. 3), the vehicle 100*b* (see FIG. 3), the XR device 100*c* (see FIG. 3), the mobile device 100*d* (see FIG. 3), the home appliances 100*e* (see FIG. 3), the IoT device 100*f* (see FIG. 3), a digital broadcast terminal, a hologram device, a public safety device, an MTC device, a medical device, a FinTech device (or a financial device), a security device, a climate/environment device, the AI server/device 200 (see FIG. 3), a base station, a network node, etc. The wireless device may be used in a mobile or fixed place according to a use-case/service.

In FIG. 15, all the various elements, components, units/portions, and/or modules in the wireless devices 1501 and 1502 may be connected to each other over a wired interface, or at least a part of them may be wirelessly connected through the communication unit 1510. For example, in the wireless devices 1501 and 1502, the controller 1520 and the communication unit 1510 may be connected by wire, and the controller 1520 and first units (e.g., 1530 and 1540) may be wirelessly connected through the communication unit 1510. Each element, component, unit/portion, and/or module of the wireless devices 1501 and 1502 may further include one or more elements. For example, the controller 1520 may consist of a set of one or more processors. As an example, the controller 1520 may consist of a set of a communication control processor, an application processor, an electronic control unit (ECU), a graphical processing unit, a memory control processor, etc. As another example, the memory 1530 may consist of a random access memory (RAM), a dynamic RAM (DRAM), a read only memory (ROM)), a flash memory, a volatile memory, a non-volatile memory, and/or a combination thereof.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals described in the present disclosure may include a cellular phone, a smart phone, a laptop computer, a digital broadcast terminal, a personal digital assistant (PDA), a portable multimedia player (PMP), a navigator, a slate computer (PC), a tablet PC, an ultrabook, a wearable devices (e.g., a smart watch, a smart glass, a head mounted display (HMD)), and the like. Furthermore, they may be used for controlling at least one device in the Internet of Things (IoT) environment or smart greenhouse.

By way of non-limiting example only, further description has been made with reference to particular types of mobile terminals. However, such teachings may be equally applied to other types of mobile terminals, such as those types noted above. In addition, these teachings may also be applied to stationary terminals such as digital TV, desktop computers, digital signage, and the like.

Embodiments related to a control method which can be implemented by the mobile terminal configured as above have been described with reference to the accompanying drawings. It is apparent to those skilled in the art that various modifications can be made to within the range without departing from the spirit and essential features of the present disclosure.

Embodiments of the present disclosure can use a restricted local operator service (RLOS) with high quality and high security by using a RLOS provided by a predetermined PLMN or a PLMN selected by a user among a plurality of PLMNs providing a RLOS.

Furthermore, embodiments of the present disclosure can previously determine which service to use in consideration of the charging element from the user's point of view.

Effects obtainable from the present disclosure are not limited by the effects mentioned above, and other effects which are not mentioned above can be clearly understood from the following description by those skilled in the art to which the present disclosure pertains.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

In the present disclosure, 'A and/or B' may mean at least one of A and/or B.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although the present disclosure has been described focusing on examples applying to the 3GPP LTE/LTE-A/NR (5G) system, the present disclosure can be applied to various wireless communication systems other than the 3GPP LTE/LTE-A/NR (5G) system.

What is claimed is:

1. A method for selecting, by a user equipment (UE), a public land mobile network (PLMN) in a wireless communication system, the method comprising:
    performing a registration on a PLMN selected by a user in a manual network selection mode;
    detecting one or more PLMNs offering access to restricted local operator service (RLOS),
    wherein the detected one or more PLMNs include:
        at least one first PLMN in a RLOS PLMN list within a universal subscriber identity module (USIM) of the UE, and
        at least one second PLMN that is not contained in the RLOS PLMN list, but offers the RLOS; and
    initiating a registration for an access to RLOS on any PLMN of the detected one or more PLMNs based on (i) that the registration on the PLMN selected by the user is not successfully achieved and (ii) that the one or more PLMNs offering access to the RLOS are detected.

2. The method of claim 1,
    based on that the registration for the access to the RLOS on the any PLMN cannot be achieved, selecting another PLMN capable of offering the RLOS among the detected one or more PLMNs; and
    performing a registration for an access to a RLOS on the another PLMN.

3. The method of claim 1, wherein the USIM of the UE includes information related to a radio access technology (RAT) allowed in each PLMN contained in the RLOS PLMN list.

4. The method of claim 1, further comprising:
    excluding the at least first PLMN in the RLOS PLMN list from the detected one or more PLMNs; and
    selecting the any PLMN, based on information related to whether to initiate a registration procedure for an access to a RLOS, from the at least one second PLMN remained after excluding the at least first PLMN.

5. The method of claim 1, wherein the any PLMN is selected, based on information related to whether to initiate a registration procedure for an access to a RLOS, among the detected one or more PLMNs.

6. The method of claim 1, wherein the any PLMN is selected, based on information related to whether to initiate a registration procedure for an access to a RLOS, among the at least one first PLMN in the detected one or more PLMNs.

7. The method of claim 1, further comprising:
    after initiating the registration for the access to the RLOS on the any PLMN, initiating a registration for an access to a RLOS on a remaining PLMN excluding the any PLMN.

8. The method of any one of claim 1, further comprising:
    detecting a plurality of PLMNs offering access to an internet service; and
    determining whether each of the detected plurality of PLMNs supports the RLOS.

9. A user equipment (UE) configured to select a public land mobile network (PLMN) in a wireless communication system, the UE comprising:
    a communication module;
    at least one processor; and
    at least one computer memory operably connected to the at least one processor and storing instructions that, based on being executed by the at least one processor, perform operations including:
    performing a registration on a PLMN selected by a user in a manual network selection mode;
    detecting one or more PLMNs offering access to a restricted local operator service (RLOS),
    wherein the detected one or more PLMNs include:
        at least one first PLMN in a RLOS PLMN list within a universal subscriber identity module (USIM) of the UE, and
        at least one second PLMN that is not contained in the RLOS PLMN list, but offers the RLOS; and
    initiating a registration for an access to RLOS on any PLMN of the detected one or more PLMNs among PLMNs based on (i) that the registration on the PLMN selected by the user is not successfully achieved and (ii) that the one or more PLMNs offering access to the RLOS are detected.

10. The UE of claim 9,
    wherein the operations further comprise:
        based on that the registration for the access to the RLOS on the first PLMN cannot be achieved, selecting another PLMN capable of offering the RLOS among the detected one or more PLMNs; and performing a registration for an access to a RLOS on the another PLMN.

11. The UE of claim 9, wherein the USIM of the UE includes information related to a radio access technology (RAT) allowed in each PLMN contained in the RLOS PLMN list.

12. The UE of claim 9, wherein the operations further comprise:
    excluding the at least first PLMN in the RLOS PLMN list from the detected one or more PLMNs; and
    selecting the any PLMN, based on information related to whether to initiate a registration procedure for an access to a RLOS, from the at least one second PLMN remained after excluding the at least first PLMN.

13. The UE of claim 9, wherein the any PLMN is selected, based on information related to whether to initiate a registration procedure for an access to a RLOS, among the detected one or more PLMNs.

14. The UE of claim 9, wherein the any PLMN is selected, based on information related to whether to initiate a registration procedure for an access to a RLOS, among the at least one first PLMN in the detected one or more PLMNs.

15. A method for selecting, by a user equipment (UE), a public land mobile network (PLMN) in a wireless communication system, the method comprising:
    detecting one or more PLMNs offering access to restricted local operator service (RLOS);
    selecting a first PLMN offering RLOS among the detected one or more PLMNs based on a RLOS PLMN list configured in the UE;
    indicating the selected first PLMN,
    wherein the UE is configured with information related to a priority order between PLMNs contained in the RLOS PLMN list; and
    initiating a registration for an access to RLOS on the detected one or more PLMNs based on the information related to the priority order between the PLMNs.

16. The method of claim 15, wherein the priority order between the PLMNs is configured based on an order described in the RLOS PLMN list.

* * * * *